US012631880B2

(12) United States Patent
Phillips et al.

(10) Patent No.: US 12,631,880 B2
(45) **Date of Patent: \*May 19, 2026**

(54) METHODS AND DEVICES RELATED TO EXTENDED REALITY

(71) Applicant: Telefonaktiebolaget LM Ericsson (publ), Stockholm (SE)

(72) Inventors: Gregoire Phillips, La Jolla, CA (US); Paul Mclachlan, San Francisco, CA (US); Héctor Caltenco, Oxie (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 34 days.

This patent is subject to a terminal disclaimer.

(21) Appl. No.: 18/644,990

(22) Filed: Apr. 24, 2024

(65) Prior Publication Data

US 2024/0345396 A1 Oct. 17, 2024

Related U.S. Application Data

(63) Continuation of application No. 17/277,869, filed as application No. PCT/SE2020/051258 on Dec. 22, 2020, now Pat. No. 12,007,561.

(51) Int. Cl.
| | |
|---|---|
| *G02B 27/01* | (2006.01) |
| *G06F 3/01* | (2006.01) |
| *G06T 19/00* | (2011.01) |

(52) U.S. Cl.
CPC ............ *G02B 27/017* (2013.01); *G06F 3/011* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 9,041,520 B2 | 5/2015 | Nakamura et al. | |
| 9,741,169 B1 | 8/2017 | Holz | |

(Continued)

FOREIGN PATENT DOCUMENTS

| | | |
|---|---|---|
| CN | 103765410 | 4/2014 |
| CN | 205333970 | 6/2016 |

(Continued)

OTHER PUBLICATIONS

Zhao et al. "Seeing VR: A Set of Tools to Make Virtual Reality More Accessible to People with Low Vision", CHI 2019, May 4-9, 2019 (Year: 2019).*

(Continued)

*Primary Examiner* — Yingchun He

(74) *Attorney, Agent, or Firm* — Rothwell, Figg, Ernst & Manbeck, P.C.

(57) ABSTRACT

A method performed by an XR rending device having an NCOD for generating, for a first user, XR content for an XR environment with which the first user is interacting. The method includes obtaining first user preference information for the first user, the first user preference information comprising sensory permission information indicating, expressly or implicitly, one or more sensory stimulations to which the first user agrees to be exposed. The method also includes obtaining XR scene configuration information for use in generating XR content for the first user. The method also includes generating XR content for the first user based on the sensory permission information and the XR scene configuration information such that the generated XR content does not comprise XR content for producing any sensory stimulation to which the first user has not agreed to be exposed. The method further includes providing the generated XR content to an XR user device worn by the first user, wherein (Continued)

the XR user device comprises one or more sensory actuators for producing one or more sensory stimulations.

19 Claims, 11 Drawing Sheets

(56) References Cited

U.S. PATENT DOCUMENTS

| | | | |
|---|---|---|---|
| 9,867,961 | B2 | 1/2018 | Shuster et al. |
| 10,445,944 | B2 | 10/2019 | Galera et al. |
| 10,499,044 | B1 | 12/2019 | Giokaris et al. |
| 10,522,106 | B2 | 12/2019 | Hazra et al. |
| 10,656,711 | B2 | 5/2020 | Kaifosh et al. |
| 10,678,335 | B2 | 6/2020 | Keller et al. |
| 10,732,280 | B1 | 8/2020 | DeSalvo et al. |
| 10,736,576 | B2 | 8/2020 | Yi et al. |
| 2009/0312817 | A1 | 12/2009 | Hogle et al. |
| 2012/0092146 | A1 | 4/2012 | Ryu et al. |
| 2013/0117377 | A1 | 5/2013 | Miller |
| 2015/0290454 | A1 | 10/2015 | Tyler et al. |
| 2016/0299563 | A1 | 10/2016 | Stafford et al. |
| 2016/0381415 | A1 | 12/2016 | Vijay |
| 2017/0169616 | A1 | 6/2017 | Wiley et al. |
| 2017/0185142 | A1 | 6/2017 | Zhang |
| 2017/0243453 | A1 | 8/2017 | Birnbaum |
| 2017/0365101 | A1 | 12/2017 | Samec et al. |
| 2018/0018827 | A1 | 1/2018 | Stafford et al. |
| 2018/0088669 | A1 | 3/2018 | Ramaprakash et al. |
| 2018/0089893 | A1 | 3/2018 | Kukis et al. |
| 2018/0161671 | A1 | 6/2018 | Heubel |
| 2018/0299952 | A1 | 10/2018 | Koker |
| 2018/0300940 | A1 | 10/2018 | Sakthivel |
| 2018/0301057 | A1 | 10/2018 | Hargrove et al. |
| 2019/0019340 | A1 | 1/2019 | Yun et al. |
| 2019/0107991 | A1 | 4/2019 | Spivack et al. |
| 2019/0114017 | A1 | 4/2019 | Choi et al. |
| 2019/0228584 | A1 | 7/2019 | Balan et al. |
| 2019/0346925 | A1 | 11/2019 | Daniels |
| 2019/0371065 | A1 | 12/2019 | Anders et al. |
| 2019/0391724 | A1 | 12/2019 | Holz et al. |
| 2020/0004329 | A1 | 1/2020 | Koker et al. |
| 2020/0016363 | A1 | 1/2020 | Marci et al. |
| 2020/0057500 | A1 | 2/2020 | Cruz-Hernandez |
| 2020/0065584 | A1 | 2/2020 | Iyer et al. |
| 2020/0104522 | A1 | 4/2020 | Collart |
| 2020/0133393 | A1 | 4/2020 | Forsland et al. |
| 2020/0401210 | A1* | 12/2020 | Bathina .................. G16H 20/70 |
| 2022/0254506 | A1 | 8/2022 | Pillitteri et al. |
| 2023/0152880 | A1 | 5/2023 | Soryal |

FOREIGN PATENT DOCUMENTS

| | | |
|---|---|---|
| CN | 205910425 | 1/2017 |
| CN | 206162486 | 5/2017 |
| CN | 108734629 | 11/2018 |
| CN | 109414164 | 3/2019 |
| CN | 114585990 | 6/2022 |
| EP | 3398008 | 11/2018 |
| JP | 6906580 | 7/2021 |
| KR | 10-2009-0085326 | 8/2009 |
| TW | 202102978 | 1/2021 |
| WO | 2008/052166 | 5/2008 |
| WO | 2011071352 | 6/2011 |
| WO | 2019/010545 | 1/2019 |
| WO | 2020/023675 | 1/2020 |
| WO | 2020/232296 | 11/2020 |
| WO | 2022139643 | 6/2022 |

OTHER PUBLICATIONS

Yeo, Elizabeth et al., "Virtual Reality Neurorehabilitation for Mobility in Spinal Cord Injury: A Structured Review", Innov Clin Neurosci. 2019; 16(1-2): (pp. 13-20).

Web Accessibility Initiative (WAI), W3C "The Business Case for Digital Accessibility", Oct. 14, 2020 (pp. 1-12).

Hargrove, Ph.D., Levi J et al., "Robotic Leg Control with EMG Decoding in an Amputee with Nerve Transfers", The New England Journal of Medicine, Sep. 26, 2013 (pp. 1237-1242).

Cook, Elizabeth et al., "UCSF Developing Device That Allows Human Brains to Control Machines", CBS San Francisco, Sep. 7, 2020 (2 pages).

Ortiz-Catalan, Max et al., Neuroprosthetics, "An osseointegrated human-machine gateway for long-term sensory feedback and motor control of artificial limbs", vol. 6, Issue 257, www.ScienceTranslationMedicie.org, Oct. 8, 2014 (9 pages).

Ericsson, "10 Hot Consumer Trends 2030", The internet of senses, Ericsson Consumer Lab, Dec. 2019 (16 pages).

Horn, Andreas et al., "Opportunities of connectomic neuromodulation", Neuroimage 221 (2020) 117180 (12 pages).

Tan, Daniel W. et al., "A neural interface provides long-term stable natural touch perception", U.S. Department of Veterans Affairs, Public Access Author manuscript, Sci Transl Med., Oct. 8, 2014; 6(257): 257ral138.(25 pages).

Advanced Amputee Solutions LLC, "Amputee Statistics You Ought To Know", AdvancedAmputees.com, 2012 (1 page).

International Search Report and Written Opinion issued in International Application No. PCT/SE2020/051258 dated Aug. 30, 2021 (14 pages).

International Search Report and Written Opinion dated Aug. 20, 2021 in International Application No. PCT/SE2020/051249 (15 pages total).

Non-Final Office Action in U.S. Appl. No. 17/277,941 having a notification date of Jan. 27, 2023 (17 pages).

Data & Statistics on Autism Spectrum Disorder, Autism Spectrum Disorder (ASD), Center for Disease Control and Prevention, Sep. 25, 2020 (2 pages total).

Epilepsy, Epilepsy Data and Statistics, Center for Disease Control and Prevention, Sep. 30, 2020 (2 pages total).

Fiest, Kirsten M. et al., "Prevalence and incidence of epilepsy: A systematic review and meta-analysis of international studies", Neurology, Jan. 17, 2017, vol. 88, No. 3, DOI: https://doi.org/10.1212/WNL.0000000000003509 (8 pages total).

Summary Fortune Business Insights, Autism Spectrum Disorder Therapeutics Market Size, Share & Industry Analysis By Type (Autistic Disorder, Asperger Syndrome, Pervasive Developmental Disorder, Others), By Treatment Type (Communication & Behavioral Therapies, Drug Therapies), and Regional Forecast 2019-2026, Aug. 2019, Pharmaceutical / Autism Spectrum Disorder Therapeutics Market (7 pages total).

Final Office Action dated May 15, 2023 in related U.S. Appl. No. 17/277,941 (17 pages).

Non-Final Office Action in U.S. Appl. No. 17/277,941 having a notification dated Sep. 27, 2023 (18 pages).

Final Office Action dated Jan. 11, 2024 in related U.S. Appl. No. 17/277,941 (21 pages).

Lopes, P., et. al., "Adding Force Feedback to mixed reality experiences and Games using Electrical Muscle Stimulation," Human Factors in Computing Systems, ACM, Apr. 21, 2018, pp. 1-13.

* cited by examiner

500

800

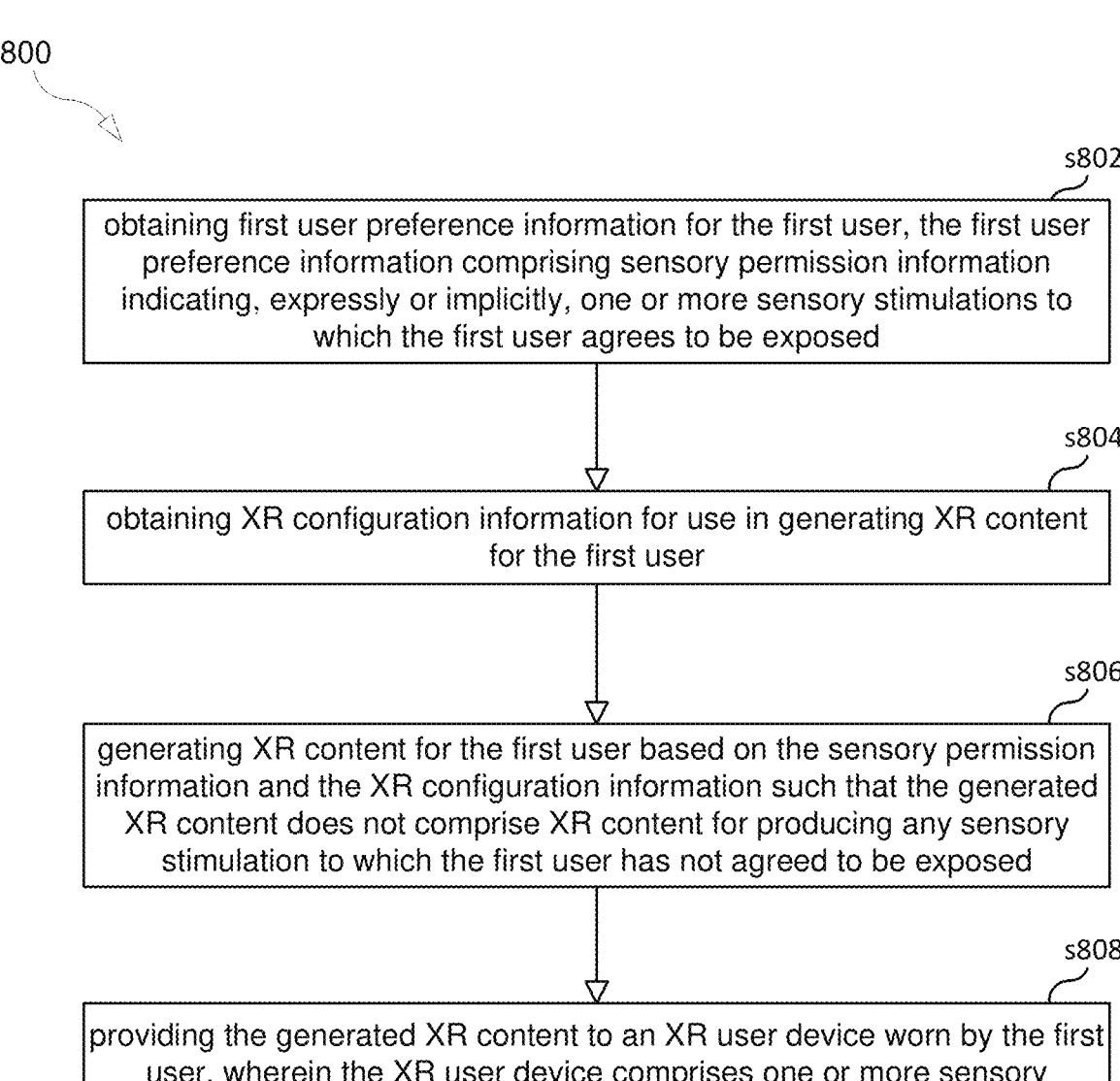

s802 obtaining first user preference information for the first user, the first user preference information comprising sensory permission information indicating, expressly or implicitly, one or more sensory stimulations to which the first user agrees to be exposed s804 obtaining XR configuration information for use in generating XR content for the first user s806 generating XR content for the first user based on the sensory permission information and the XR configuration information such that the generated XR content does not comprise XR content for producing any sensory stimulation to which the first user has not agreed to be exposed s808 providing the generated XR content to an XR user device worn by the first user, wherein the XR user device comprises one or more sensory actuators for producing one or more sensory stimulations

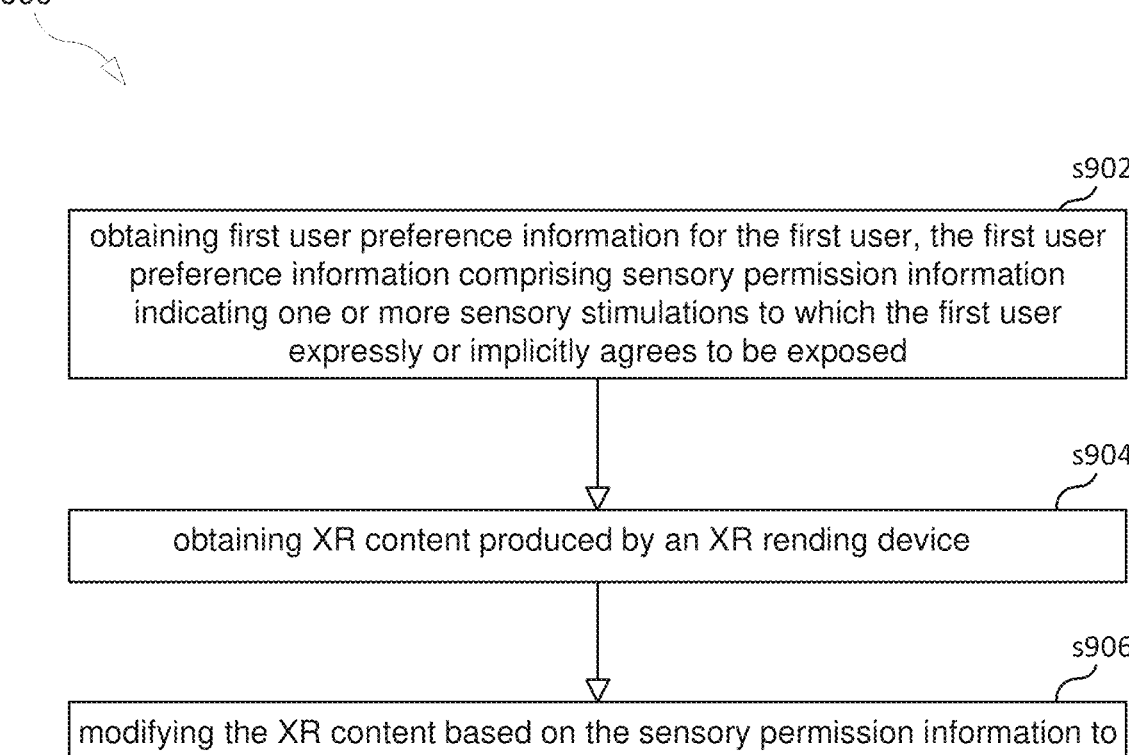

s902 obtaining first user preference information for the first user, the first user preference information comprising sensory permission information indicating one or more sensory stimulations to which the first user expressly or implicitly agrees to be exposed s904 obtaining XR content produced by an XR rending device s906 modifying the XR content based on the sensory permission information to produce modified XR content that does not comprise XR content for producing any sensory stimulation to which the first user has not agreed to be exposed, wherein the modified XR content is translated by an XR user device into at least one sensory stimulation

FIG. 9

METHODS AND DEVICES RELATED TO EXTENDED REALITY

CROSS-REFERENCE TO RELATED APPLICATIONS

This application is a continuation of U.S. application Ser. No. 17/277,869 filed on 2021 Mar. 19 (now U.S. Pat. No. 12,007,561, issued on 2024 Jun. 11), which is the 35 U.S.C. § 371 National Stage of International Patent Application No. PCT/SE2020/051258, filed Dec. 22, 2020. The above identified applications are incorporated by this reference

TECHNICAL FIELD

This disclosure relates to an extended reality (XR) device, a neuro-muscular connectivity device, methods performed by these devices, computer programs and carriers.

BACKGROUND

Extended Reality

Extended reality (XR) uses computing technology to create simulated environments (a.k.a., XR environments or XR scenes). XR is an umbrella term encompassing virtual reality (VR) and real-and-virtual combined realities, such as augmented reality (AR) and mixed reality (MR). Accordingly, an XR system can provide a wide variety and vast number of levels in the reality-virtuality continuum of the perceived environment, bringing AR, VR, MR and other types of environments (e.g., mediated reality) under one term.

Augmented Reality (AR)

AR systems augment the real world and its physical objects by overlaying virtual content. This virtual content is often produced digitally and incorporates sound, graphics, and video. For instance, a shopper wearing AR glasses while shopping in a supermarket might see nutritional information for each object as they place the object in their shopping carpet. The glasses augment reality with additional information.

Virtual Reality (VR)

VR systems use digital technology to create an entirely simulated environment. Unlike AR, which augments reality, VR is intended to immerse users inside an entirely simulated experience. In a fully VR experience, all visuals and sounds are produced digitally and does not have any input from the user's actual physical environment. For instance, VR is increasingly integrated into manufacturing, whereby trainees practice building machinery before starting on the line. A VR system is disclosed in US20130117377 A1.

Mixed Reality (MR)

MR combines elements of both AR and VR. In the same vein as AR, MR environments overlay digital effects on top of the user's physical environment. However, MR integrates additional, richer information about the user's physical environment such as depth, dimensionality, and surface textures. In MR environments, the user experience therefore more closely resembles the real world. To concretize this, consider two users hitting a MR tennis ball in on a real-world tennis court. MR will incorporate information about the hardness of the surface (grass versus clay), the direction and force the racket struck the ball, and the players' height.

XR User Device

An XR user device is an interface for the user to perceive both virtual and/or real content in the context of extended reality. An XR user device has one or more sensory actuators, where each sensory actuator is operable to produce one or more sensory stimulations. An example of a sensory actuator is a display that produces a visual stimulation for the user. A display of an XR user device may be used to display both the environment (real or virtual) and virtual content together (i.e., video see-through), or overlay virtual content through a semi-transparent display (optical see-through). The XR user device may also have one or more sensors for acquiring information about the user's environment (e.g., a camera, inertial sensors, etc.). Other examples of a sensory actuator include a haptic feedback device, a speaker that produces an aural stimulation for the user, an olfactory device for producing smells, etc.

Object Recognition

Object recognition in XR is mostly used to detect real world objects for triggering digital content. For example, the user may look at a fashion magazine with augmented reality glasses and a video of a catwalk event would play in a video for the user. Sound, smell, and touch are also considered objects subject to object recognition.

The Internet-of-Things (IoT)

The "Internet-of-Things" is the interconnection of computing devices embedded into ordinary items and systems via the Internet. The IoT enables the application of computing capabilities to the functioning of any device capable of connecting to the Internet, thereby facilitating a wide range of possible remote user interactions.

5G

First launched commercially in 2019, 5G, including New Radio (NR) and 5G Core has several key technological improvements over earlier generations of mobile network standards. As defined by the 3rd Generation Partnership Project (3GPP), 5G NR and 5GC standards include one millisecond end-to-end latency; 20 gigabit-per-second (Gbps) download speeds; and 10 Gbps upload speeds. 5G NR, WiFi technology, the expanding edge and cloud computing technology (hereinafter, "edge-cloud"), and the increasing proliferation of the internet of things (IoT) devices has expanded the market for interactive digital content. In accordance with this trend, analysts expect the popularity of XR to grow as 5G NR is deployed internationally. Published in 2020, Ericsson's Consumer Lab's Report suggests that most consumers expect merged reality technologies to integrate XR technology into their daily lives by 2030 (https://www.ericsson.com/4ac 13b/assets/local/reports-papers/consumerlab/reports/2019/10hctreport2030.pdf, retrieved on 21 Dec. 2020). These trends highlight the importance of expanding the scope and methods for interactivity with digital environments in XR.

While it is difficult to forecast the potential market size of XR-specific content, the size of the digital advertising industry alone was $330 billion 2019. As XR headsets become ubiquitous, and media increasingly are designed to support XR, it follows that XR media will become a multibillion industry in its own right. Yet, this technology's long-term viability depends upon its accessibility to enable users to seamlessly interact with the media, overlays, and objects in their XR environment. Current methods for such interactivity are rudimentary; they focus almost exclusively on the use of physical remote joysticks to initiate interaction and provide coarse sensory feedback through the same devices. While wearable technology such as haptic gloves and bodysuits advance, current embodiments are limited to one-way transmission of interactivity, which allow users to experience prerecorded haptics but not interact with objects in real time. Without two-way exchange of haptic and sensory information, and edge-cloud processing, the range of interaction possibilities in XR is reduced.

Three key technical impediments have hitherto limited interactivity in XR. The first is limitation is the tradeoff between XR user device compute and battery life. Today, XR user devices typically perform necessary operations locally on the device, such as generating spatial maps e.g., via simultaneous localization and mapping (SLAM) or structure from motion (SfM), or performing object detection. As this requires significant compute power, this has implications for form factors and battery life. Mobile network latency and speed have hitherto limited widespread offloading of these operations to the cloud and/or the edge (hereinafter, the "edge-cloud"). Latency in legacy networks, such as current 3G and 4G networks, can be too high to perform real-time processing in the edge-cloud. Beyond causing poor user experience through delays and jitter, significant latency in overlay movement and/or placement can cause users to feel motion sick.

The second challenge relates to broad and general coverage of networks with sufficiently low latency to process interactivity in XR environments. While WiFi 6 has sufficiently low latency, the coverage range for any given WiFi network is limited; XR interactivity requires ubiquitous low latency networking. 5G has sufficiently low latency, and, moreover, will be deployed in most markets. Not only will this allow XR headsets to offload significant compute into the edge-cloud, it will allow the environment, overlays, and experiences to respond to user input with minimal delay.

The final challenge is creating an adaptable and interactive mechanism in XR. Such a mechanism requires a complex orchestration between (1) user behavior and interaction, (2) processing that data on the UE, (3) potentially offloading data into the edge-cloud, (4) fetching updated overlays or responses from third party APIs, and (5) potential collaboration and shared experiences among XR users. This orchestration problem highlights the need for a mechanism to mediate the complex informational inputs and outputs in order to create a sensory-immersive and responsive XR experience without relying on physical objects upon which to map interactions. Existing technologies sidestep this issue by reducing the dimensions of information and user interaction to physical devices or wearable features that interact with users through visual stimulation, sound responses, or vibration. While this greatly reduces the amount of computation required by homing in on specific physical inputs, like hand-held controllers or wearable devices, in a limited visual field, this reduces the degree of interactivity and sensitivity to object interactions. This reduction blunts the possibilities of XR experiences for all users, and furthermore threatens to make the future of XR experiences inaccessible to those with disabilities that impair their ability to use these wearables and controllers.

Limiting the type and form interactivity in XR, e.g. the reduction in potential forms and means of interaction, has hitherto been a solution to overcome the two challenges highlighted above and enable XR headsets with smaller form factors to compute XR content. However, mapping sensory and haptic feedback to interaction with controllers or point-of-contact wearables limits these experiences' range along two dimensions: (1) sensory interactivity and (2) accessibility. Current hand-held XR remote controller devices and point-of-contact wearables restrict multi-modal engagement by reducing tactile interaction, both in the form of inputs to the XR environment and the outputs through feedback to the user, to moving XR objects. This makes the sensory interaction between the user and the XR environment secondary to the blunted feedback responses of the controller or wearable without, in most cases, taking into account the outcome of that interaction on the entire limb in question. This reduces sensory interaction to blunted tactile sensations through a remote object.

Remote controller devices and point-of-contact wearables also limit accessibility by restricting experiences to people without physical disabilities or injuries that prevent them from interacting with, wearing, and/or handling these objects. Facilitating sensory interactions through controller devices may overcome some of the problems of complex computation or sensor visibility, but they do so at the expense of making XR technology accessible to many of the over 200,000 people a year that experience body part amputation in the United States alone, and a large fraction of the over 1 billion physically disabled people worldwide. Now that the advance of 5G NR technology and edge-cloud computing have made possible the network connectivity and complex computation necessary to move functionality outside of the local device, it is time to expand the horizon of interactive XR experiences to a more inclusive and accessible XR future.

These limitations to sensory interactivity and accessibility are important for at least two reasons: (1) the potential to capture a larger share of the market through accessible XR interaction, and (2) a normative commitment to the principles of accessibility to XR technologies for individuals with disabilities. Individuals with physical disabilities that may otherwise impede them from fully utilizing XR technologies account for a substantial share of the consumer market. The Web Accessibility Initiative (W3C WAI) estimates the global market for individuals with disabilities to account for over one billion people with a spending power of greater than $6 trillion (USD). A study commissioned by Microsoft in 2017 found that investments in accessible tech help companies not only gain market share in consumer markets, but also better retain existing consumers by signaling a commitment to accessibility as a corporation. Investing in more diverse sensory-interactive experiences that also enable greater accessibility can pay dividends through a greater and more durable share of consumer markets.

Normative principles of just accessibility by individuals with physical disabilities should also compel the development of XR technologies that extend the sensory and interactive experiences of XR environments to these communities. But it isn't just principles that compel these changes. State legal systems have already begun to expand their existing accessibility protections for individuals with disabilities into the cyber domain, with several lawsuits challenging existing regulations in the United States and the European Union to extend disability rights to web technologies and succeeding in securing expensive concessions from internet technology corporations. With internet accessibility at the forefront of the accessibility movement, we have both a normative responsibility and financial interest in investing in accessible technologies before products hit the market.

Prior state of the art can be separated into two dimensions. The state of the art in interactive XR environments is currently object interactivity through handheld devices (see, e.g., US20190228584 A1) and wearable overlays interacting within a visual or wireless connectivity sensor field (see, e.g., U.S. Pat. No. 10,499,044 B1 and U.S. Pat. No. 10,656, 711 B2). The state of the art in neuromuscular sensor and feedback technology is currently electro-magnetic node technology that mimics physical sensation and infers user intent using neuro-electrical signaling (see, e.g., U.S. Pat.

No. 10,656,711 B2). This technology is currently only marketable as under-skin devices, but prototype over-skin devices have been invented and studied in limited research trials (see, e.g., Tan "A neural interface provides long-term stable natural touch perception," Science Translational Medicine (2014), Vol. 6, Issue 257, pp. 257ra138. DOI: 10.1126/scitranslmed.3008669). These technologies provide the foundations for a mechanism that links interactive XR environments with realistic sensory feedback to users.

SUMMARY

An object of this disclosure is to enable improved security for a user of an XR system.

Certain challenges presently exist. For instance, what is missing is a mechanism to mediate the complex inputs and outputs to not only manage an interactive sensory experience in an XR environment, but to do so in a way that enables and empowers individuals with physical disabilities to engage on a level playing field with non-disabled users with such technologies. That is, for example, the following features are missing in existing XR systems: the ability for XR systems to provide interpretable feedback to the nervous system without the aid of a direct wearable or handheld devices at the point of sensation; the ability for devices to integrate XR environments with sensory experiences that connect neurological sensation to environmental interaction; the capability to extend sensory experiences outside of the physical contact area with users; and an architecture for preserving user consent at each stage of a sensory interaction in XR space.

Accordingly, in one aspect there is provided a method, performed by an XR rendering device having a neuro-muscular connectivity overlay device (NCOD) for generating, for a first user, XR content for an XR environment with which the first user is interacting. The method includes obtaining first user preference information for the first user, the first user preference information comprising sensory permission information indicating, expressly or implicitly, one or more sensory stimulations to which the first user agrees to be exposed. The method also includes obtaining XR scene configuration information for use in generating XR content for the first user. The method further includes generating XR content for the first user based on the sensory permission information and the XR scene configuration information such that the generated XR content does not comprise XR content for producing any sensory stimulation to which the first user has not agreed to be exposed. The method also includes providing the generated XR content to an XR user device worn by the first user, wherein the XR user device comprises one or more sensory actuators for producing one or more sensory stimulations.

In another aspect there is provided a computer program comprising instructions which when executed by processing circuitry of a XR rendering device causes the XR rendering device to perform the method. In another aspect there is provided a carrier containing the computer program, wherein the carrier is one of an electronic signal, an optical signal, a radio signal, and a computer readable storage medium. In another aspect there is provided a XR rendering device, where the XR rendering device is configured to perform the method. In some embodiments, the XR rendering device includes processing circuitry and a memory containing instructions executable by the processing circuitry, whereby the XR rendering device is configured to perform the method.

In another aspect there is provided a method performed by neuro-muscular connectivity overlay device, NCOD, for moderating a first user's sensory experience with respect to an XR environment with which the first user is interacting. The method includes obtaining first user preference information for the first user, the first user preference information comprising sensory permission information indicating one or more sensory stimulations to which the first user expressly or implicitly agrees to be exposed. The method also includes obtaining XR content produced by an XR rending device. The method further includes modifying the XR content based on the sensory permission information to produce modified XR content that does not comprise XR content for producing any sensory stimulation to which the first user has not agreed to be exposed, wherein the modified XR content is translated by an XR user device into at least one sensory stimulation.

In another aspect there is provided a computer program comprising instructions which when executed by processing circuitry of an NCOD causes the NCOD to perform the method. In another aspect there is provided a carrier containing the computer program, wherein the carrier is one of an electronic signal, an optical signal, a radio signal, and a computer readable storage medium. In another aspect there is provided an NCOD, where the NCOD is configured to perform the method. In some embodiments, the NCOD includes processing circuitry and a memory containing instructions executable by the processing circuitry, whereby the NCOD is configured to perform the method.

The NCOD disclosed herein is advantageous for numerous reasons. As one example, the NCOD provides an opportunity to extend the benefits of sensory integration to the millions of individuals currently living with injuries or disabilities that leave them without the use of limbs. As another example, the NCOD provides a bridge between emerging XR technologies and the frontier of biomedical research on amputation, neurological injury, and rehabilitation. The market for prosthetic limb rehabilitation and recovery is growing rapidly, with advances in the integration of neuromuscular sensory integration leaving the door open for the use of XR environments in this line of research. As yet another example, and most broadly, the NCOD serves as a bridge to extended reality interaction beyond physical controllers or cumbersome full-contact wearable technology. By providing a mechanism to map and communicate neuro-connective interactive responses without a physical overlay, the NCOD will allow XR environments to shed many of the bulky equipment constraints that may ultimately limit the convenience and marketability of devices to users seeking a streamlined experience in a market increasingly dominated by clunky equipment and sensory-limiting wearable technologies. It will also allow new technologies to do so in a way that preserves the consensual privacy and autonomy of individuals by allowing users the ability to identify which experiences they would like to experience in a given environment and on a given body feature.

The NCOD extends the accessibility and functional horizons of XR environments to construct fully interactive limb features capable of providing users with sensory feedback through non- and minimally-invasive, electromyographic (EMG) enabled wearable technology. This innovation, and its promise for millions of individuals with disabilities in facilitating social and commercial interactions in an expanded XR environment, are possible thanks to: advances in new generation networks such as 5G NR that create lower latency environments to maintain connectivity, advances in edge-cloud computing that make complex computation possible without relying on cumbersome devices tethered to home power or computer sources; and innovation in the use of both surface and intramuscular electrode-enabled EMG technology to communicate muscle movement to XR limb and facilitate sensory feedback through peripheral nerve electrode technology.

In short, advantages of the embodiments disclosed herein include the following: accessibility by extending sensory and interactive XR experiences to individuals with limb-affected disabilities; adaptability by extending the range of XR experiences beyond physical interactions with remotes or point of contact wearables to fully interactive, sensory compatible experiences rendered and managed completely within an XR environment; speed by pairing 5G NR with edge-cloud computing will allow the transfer of object-related data to complete much more quickly than current implementations; scalability as the architecture is edge-cloud ready; flexibility due to the fact that the architecture allows for the masking of objects using any type of network connected device; context by allowing users to subset objects, store them in the edge-cloud, and gain insights about those objects; and trustworthiness by integrating sensory permissions into each step of the sensory environment, this invention protects user consent to sensory experiences in XR environments, thereby preserving a principle of trustworthiness in XR technology.

BRIEF DESCRIPTION OF THE DRAWINGS

The accompanying drawings, which are incorporated herein and form part of the specification, illustrate various embodiments.

FIG. 8 is a flowchart illustrating a process according to an embodiment.

FIG. 9 is a flowchart illustrating a process according to an embodiment.

DETAILED DESCRIPTION

Figure 1:
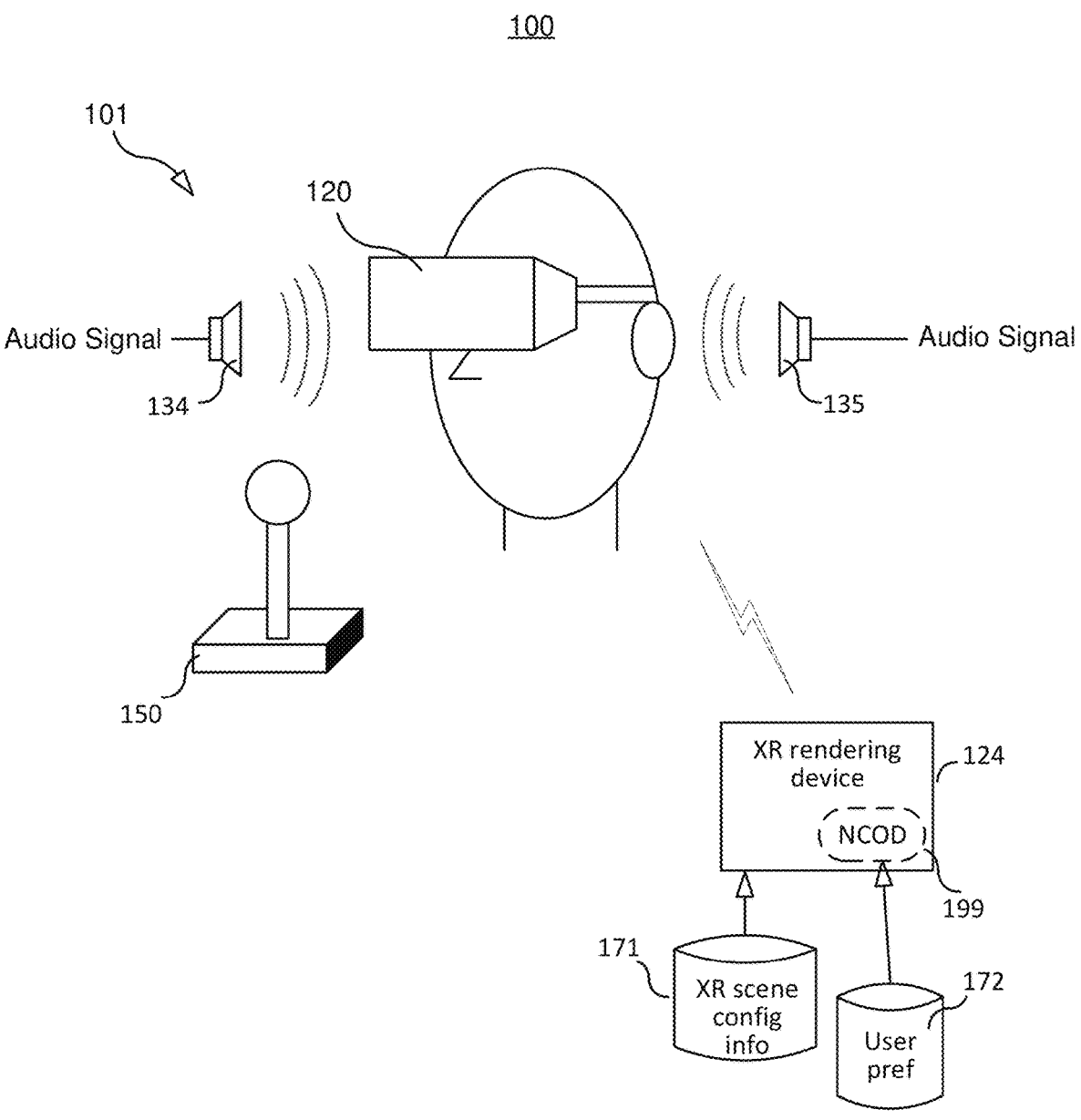
FIG. 1 illustrates an XR system according to an embodiment.

FIG. 1 illustrates an extended reality (XR) system 100 according to some embodiments. As used herein "XR" is an umbrella term encompassing virtual reality (VR) and real-and-virtual combined realities, such as augmented reality (AR) and mixed reality (MR). As shown in FIG. 1, XR system 100 includes an XR user device 101 and an XR rendering device 124, which may include a neuro-muscular connectivity overlay device (NCOD) 199. In the example shown in FIG. 1, XR rendering device 124 is located remotely from XR user device 101 (e.g., XR rendering device 124 may be a component of a base station (e.g., a 4G base station, a 5G NR base station, a wireless local area network (WLAN) access point, etc.) or other node in a radio access network (RAN)). The XR rendering device 124 may for example be a part of the 5G baseband unit or virtualized baseband function of a 5G base station or any future base station. Accordingly, in this embodiment, XR user device 101 and XR rendering device 124 have or are connected to communication means (transmitter, receiver) for enabling XR rendering device 124 to transmit XR content to XR user device 101 and to receive input from XR user device 101 (e.g., input from sensing units 221 and 222, described below). Any protocol may be used to transmit XR content to XR user device 101. For instance, video and/or audio XR content may be transmitted to XR user device 101 using, for example, Dynamic Adaptive Streaming over the Hypertext Transfer Protocol (DASH), Apple Inc.'s HTTP Live Streaming (HLS) protocol, or any other audio/video streaming protocol. As another example, non-audio and non-video XR content (e.g., instructions, metadata, etc.) may be transmitted from XR rendering device 124 to XR user device 101 using, for example, HTTP or a proprietary application layer protocol running over TCP or UDP. For instance, the XR user device 102 may transmit an HTTP GET request to XR rendering device 124, which then triggers XR rendering device 124 to transmit an HTTP response. The body of this response may be an extensible markup language (XML) document or a Javascript Object Notation (JSON) document. In such an embodiment, XR rendering device 124 may be an edge-cloud device and XR rendering device 124 and XR user device 101 may communicate via a 5G NR network, which has very low latency, as described above. In other embodiments XR rendering device 124 may be a component of XR user device 101 (e.g., XR rendering device 124 may be a component of an XR headset 120).

In the embodiment shown in FIG. 1, XR user device 101 includes: XR headset 120 (e.g., XR goggles, XR glasses, XR head mounted display (HMD), etc.) that is configured to be worn by a user and that is operable to display to the user an XR scene (e.g., an VR scene in which the user is virtually immersed or an AR overlay), speakers 134 and 135 for producing sound for the user, and one or more input devices (e.g., joystick, keyboard, touchscreen, etc.), such as input device 150 for receiving input from the user (in this example the input device 150 is in the form of a joystick). In some embodiments, XR user device 101 includes other sensory actuators, such as an XR glove, an XR vest, and/or an XR bodysuit that can be worn by the user, as is known in the art. As used herein the phrase "worn by the user" is a broad term that encompasses only items that are placed on the person's body (e.g., a glove, a vest, a suit, goggles, etc.), but items also implanted within the person's body.

Figure 2:
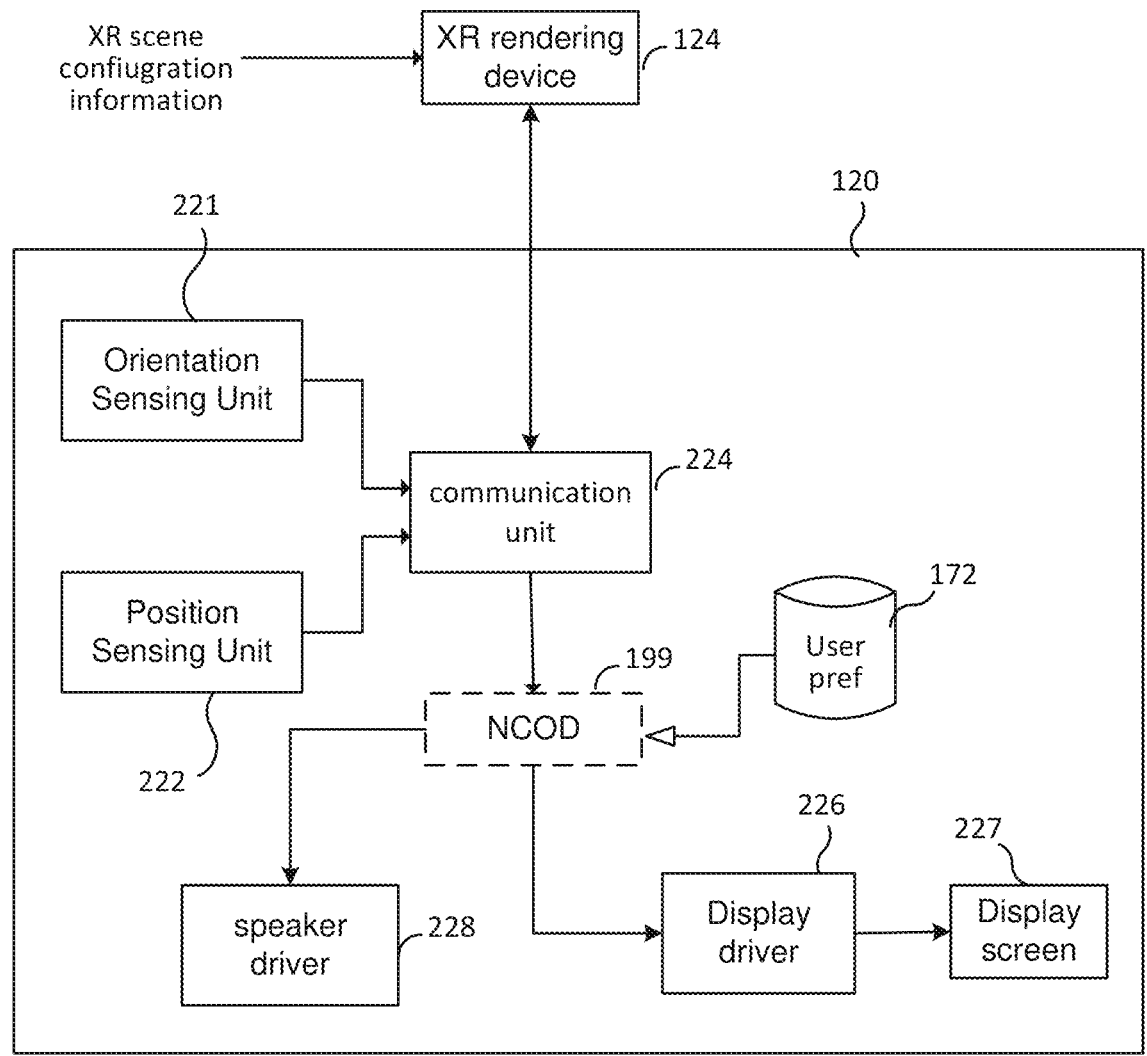
FIG. 2 illustrates an XR headset according to an embodiment.

FIG. 2 illustrates XR headset 120 according to an embodiment. In the embodiment shown, XR headset 120 includes an orientation sensing unit 121, a position sensing unit 122, and a communication unit 224 for sending data to and receiving data from XR rendering device 124. XR headset 120 may further include NCOD 199. Orientation sensing unit 121 is configured to detect a change in the orientation of the user and provides information regarding the detected change to XR rendering device 124. In some embodiments, XR rendering device 124 determines the absolute orientation (in relation to some coordinate system) given the detected change in orientation detected by orientation sensing unit 121. In some embodiments, orientation sensing unit 121 may comprise one or more accelerometers and/or one or more gyroscopes.

In addition to receiving data from sensing units 121 and 122, XR rendering device 124 may also receive input from input device 150 and may also obtain XR scene configuration information (e.g., XR rending device may query a database 171 for XR scene configuration information). Based on these inputs and the XR scene configuration information, XR rendering device 124 renders a XR scene in real-time for the user. That is, in real-time, XR rendering device 124 produces XR content, including, for example, video data that is provided to a display driver 126 so that display driver 126 will display on a display screen 127 images included in the XR scene and audio data that is provided to speaker driver 128 so that speaker driver 128 will play audio for the using speakers 134 and 135. The term "XR content" is defined broadly to mean any data that can be translated by an XR user device into a perceivable sensations experienced by the user. Accordingly, examples of XR content include not only video data and audio data, but also commands for instructing a sensory actuator to produce a sensory input (e.g., smell, touch) for the user.

NCOD 199, whether it is included in XR rendering device 124 and/or XR user device 101, enables the user to control the sensory inputs of their virtual and real-world environments. For example, through a user interface generated by NCOD 199, the user may specify which sensory experiences they would like to control in their virtual and real-world environments either through a manual, automatic, or semi-automatic process. For instance, the user may want to control the user's exposure to flashing lights because the user is sensitive to flashing lights.

In some embodiments, NCOD 199 uses sensor-mapped features of the XR environment to simulate physical position, interaction, and, when combined with electromyographic wearable devices, neuro-muscular sensation. NCOD 199 connects the computational environment producing the components of the XR interface to a parallel system simulating the features of a physical body feature, such as an existing or virtually generated limb, to map into XR space at its current position or in an alternate XR environment. This parallel system manages the physical appearance, position, interaction, and sensory capabilities of the body feature, communicating the sensory information from the feature to the XR environment and from the environment to the user through visual and neuromuscular feedback in the XR environment's point of contact.

Current solutions for connecting XR environments to sensory feedback devices are limited in scope to wearable or hand-held devices that rely on motion outputs to interact with the interface or predict user actions, emotional states, or attentiveness. These solutions are limited in four crucial ways: they restrict the use of sensory input to visible, tangible and/or manipulatable devices, such as handheld controllers or hand gesture recognition; they only communicate sensory information from the user to the environment; they do not directly integrate the sensory information into the XR experience; and they do not comprehensively evaluate the sensory preferences of the user at every stage of the interaction. In some embodiments, NCOD 199 addresses all four of these limitations by providing a system model for integrating cutting-edge advances in neural interfacing, edge-computing, and XR environment interactions to expand the range of interactive experiences in XR, establish trustworthy features of sensory consent within the architecture of XR technology, and extend accessibility to users with neurological or physical disabilities through a system that enables greater flexibility in the relaying of sensory interactions in XR.

NCOD 199 paves the way for the use of XR environments as a tool of Human-computer interaction and bio-medical research and user entertainment while also opening the door to future applications that extend sensory experiences beyond user's physical environment. While solving critical accessibility problem limiting XR technology's proliferation to millions of individuals with disabilities, this disclosure provides a roadmap for all future sensory-interactive experiences as we seek to move beyond remote controlled interfaces and into a period of greater integration of sensory experiences in XR spaces.

NCOD 199 can be used to moderate sensory experiences in virtual environments in at least two ways. First, NCOD 199 can direct XR rendering device 124 to make changes to the XR content directly by removing features with sensory qualities that users specify as undesirable. Second, NCOD 199 can modify the XR content produced by XR rendering device 124 to make changes to the way features of the virtual environment are experienced (e.g., maintaining the same qualities and information in the generation or rendering of the virtual environment but changing only the way that users interact in that environment).

The first method involves a direct intervention by NCOD 199 into the generation or rendering of an XR environment. In this process, NCOD 199 would simultaneously identify and moderate the visual, auditory, tactile, and/or other sensory experience as the XR user device generates or renders the environment for user interaction. This method requires the necessary permissions and degree of control for NCOD 199 to edit or change content in the XR environment as it is being generated.

Figure 3A:
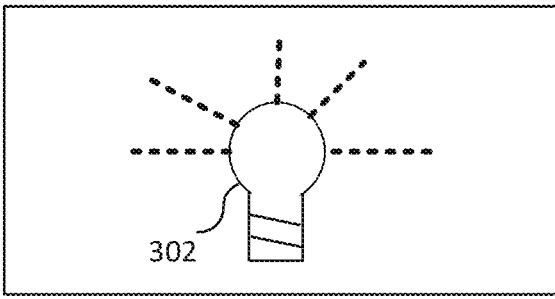
FIGS. 3A-3C illustrate example use cases.
Figure 3B:
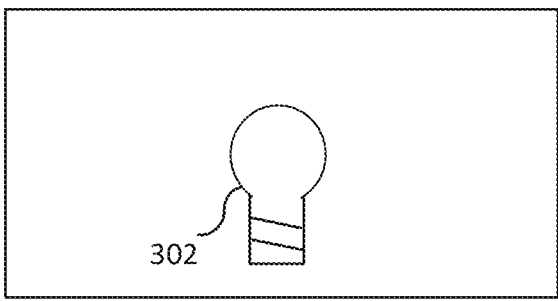
Figure 3C:
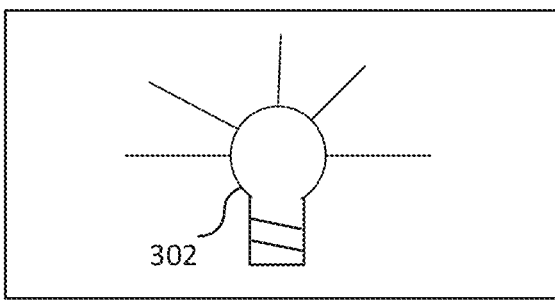

FIGS. 3A, 3B, and 3C provides an example of direct intervention by NCOD 199 to moderate a virtual visual sensory experience. In this simplified illustration, NCOD 199 has detected that the XR scene configuration information indicates that the XR content should or must include data corresponding to a particular sensory stimulation (which in this case is a light source 302 that is strobing). NCOD 199 has also determined, based on the user's preference information, that the user has not agreed to be subject to strobing lights. Accordingly, the NCOD 199 causes XR rendering device 124 to generate the XR content such that the XR content takes into account the user's stated preference. Depending on the user's preferences within NCOD 199, NCOD 199 may cause XR rendering device 124 to moderate this sensory experience in one of two ways. For example, as shown in FIG. 3B, XR rendering device 124 may completely remove the violating sensory experience (i.e., the strobing of the light source) when generating the XR content for the XR scene. That is, in the example shown in FIG. 3B, the light source 302 is not emitting any light. Alternatively, as shown in FIG. 3C, the light source 302 is emitting any light, but is not strobing (i.e., the light output remains constant).

Rather than controlling XR rendering device 124 such that, for example, the XR content produced by XR rendering device 124 does not include any content that violates the user's preferences, the second method involves NCOD 199 modifying the XR content generated by XR rendering device 124. In this way, NCOD 199 preserves the sensory components of the virtual environment in the rendering of an XR experience, but changes the way that XR user device 101 process the XR content in a way that either removes or reduces the sensory stimulation experience by the user. This is illustrated in FIGS. 4A and 4B.

Figure 4A:
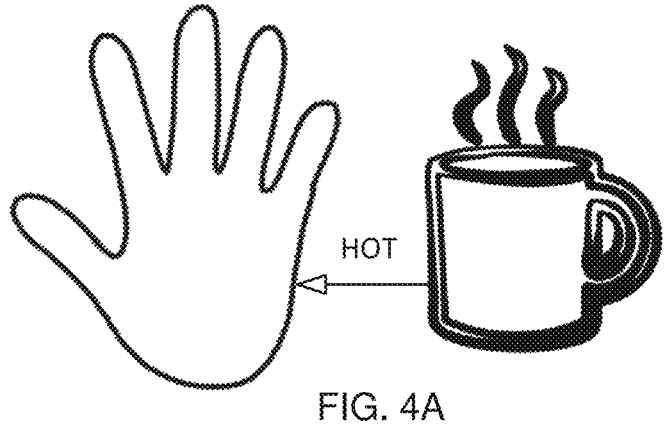
FIGS. 4A and 4B illustrate an example use case.
Figure 4B:
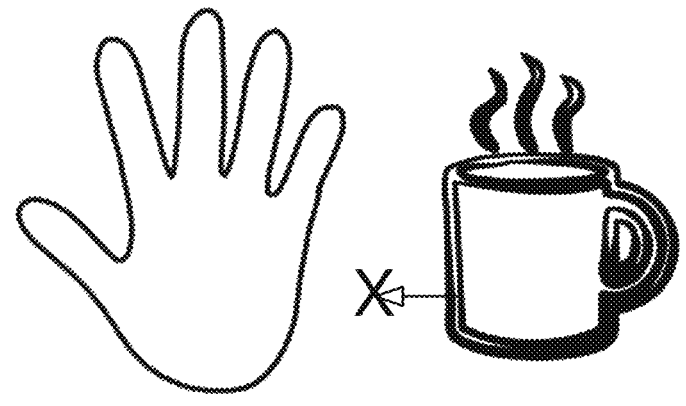

In this illustrated example, NCOD 199 obtains the XR content generated by XR rendering device 124 and detects that the XR content includes data corresponding to a particular sensory stimulation (e.g., heat from a coffee cup 402, as shown in FIG. 4A). NCOD 199 also obtains user preference information for the user (which user preference information may be stored in user preference database 172) and determines that that the user has expressly (or implicitly) stated that the user does not want to receive any temperature sensory stimulations. Accordingly, after determining that if XR user device 101 were to translate the XR content into a virtual environment the user would experience a heat sensation, NCOD 199 may modify the XR content so that when XR user device 101 translates the XR content into a virtual environment the user would not experience any heat sensation as shown in FIG. 4B. That is, as shown in FIG. 4B, NCOD 199 completely removes the violating sensory experience when generating the XR environment. In this illustration, the XR system has preserved the sensory data in the environment, but changed the way the wearable sensory detection overlay reads that data to exclude the temperature sensation entirely.

In some embodiments, NCOD 199 can also be used to moderate sensory experiences in real-world environments using sensory actuating devices—from common devices such as headphones and eye coverings to any other device that can change an user's perception of their sensory environment—to intercept and change a sensory input before the user experiences the sensory input.

Accordingly, in some embodiments, NCOD 199 receives data from one or more sensors of XR user device 101 (e.g., camera, microphone, heat sensor, touch sensor, olfactory sensor) that take in sensory stimuli from the surrounding real-world environment. NCOD 199 would then leverage this sensory awareness together with the user preference information to detect whether the user would be exposed in the real-world to a stimuli that the user seeks to avoid an then to take the appropriate remedial action (e.g., darken the user's glasses if the user would be exposed to a strobing light or use noise cancelling headphones to cancel unwanted noise). NCOD 199 can be local to XR user device 101 or it could be in the edge-cloud and communicate with XR user device 101 using a low latency network (e.g., 5G NR).

NCOD 199 can moderate real-world sensory experiences by changing the way sensory stimuli is experienced by the user. Moderating such experiences in the real world poses a unique challenge. Unlike in a virtual context, users cannot always easily change the way their physical environment is generated, and must therefore rely on sensory modifying devices to counteract or change the experience. This is like the method of indirect moderation described in the virtual context above and illustrated in FIGS. 4A and 4B. Once NCOD 199 has identified an undesirable sensory stimulation (via manual, automatic, or semi-automatic means, as described below), it directs a paired sensory device or sensory actuator to moderate that sensation, for example by preventing the user from experiencing it entirely.

1. Process and Overlay Layout.

Figure 5:
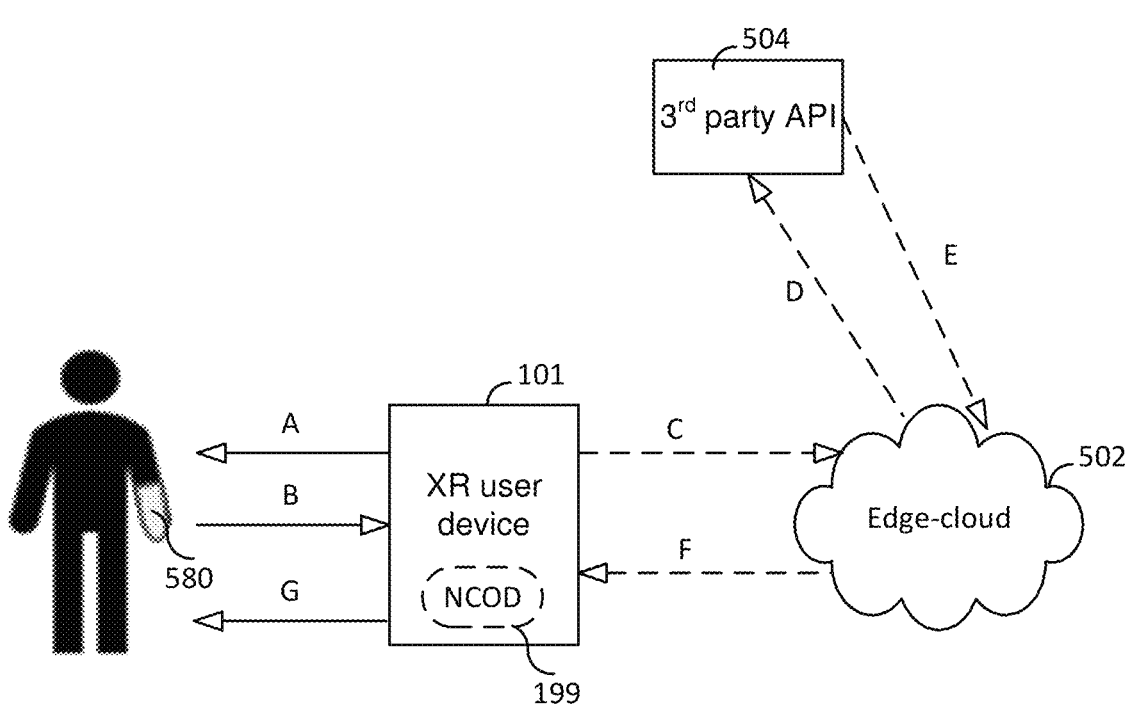
FIG. 5 illustrates a system according to an embodiment.

FIG. 5 illustrates a system 500, according to one embodiment, in which NCOD 199 operates. The system 500 includes XR user device 101, which is capable of creating and maintaining an XR environment, and access to an edge-cloud 502 to 1) assist in any advanced computing of limb position and interactivity and 2) facilitating user interactions outside of the user's local network.

In the example shown, there are seven possible exchanges of information (A-G) that occur. The first, denoted A, is from the XR user device to the user. In this exchange, the XR user device "activates" to validate the identity of the user and initialize the computational operation of the generation of body features and the sensory overlay to be managed by NCOD 199 within XR environment. The device follows a protocol for the generation of the limb in accordance to pre-defined measurement dimensions that are beyond the scope of this IvD.

The second, denoted B, is from the user to the XR user device. Here, the user provides positional and movement inputs to the XR environment through a wearable device 580 attached to a muscular system, e.g., using EMG electrodes, that can most optimally still communicate movement of the limb either from the direct point of contact or through contact with areas functionally proximate to the limb. The user also provides specific permissions through the XR user device interface indicating which types of interactive features, including sensory features, they would like to enable in their environment. These features are broken down in the specific interaction ID descriptions outlined below.

The third is from the XR user device to the edge-cloud, denoted C. Here, the XR user device sends positional and movement data to the edge-cloud, which can aid in the generation of a high-resolution dynamic mapping of the three-dimensional body feature in a predefined XR environment. The local XR user device can generate a lower-quality dynamic mapping of the XR limb without connection to the edge-cloud. The XR user device also sends the interactive permissions to the edge-cloud to authorize interaction with features of the XR environment outside of the user's local environment.

The fourth is from the edge-cloud to 3rd party APIs 504, denoted D. If the user initiates an action, such as an in-experience purchase or interaction with a feature from a third party, the edge-cloud pushes this request to the third-party API 504. Preferably, the transactions are protected with the appropriate level of content encryption and/or security features from XR user device to edge-cloud, and from edge-cloud to API.

The fifth is from the 3rd party API to the edge-cloud, denoted E. In cases in which the user's request requires a response from the 3rd party, this data will be transmitted to the edge-cloud and returned to the XR user device in the appropriate data format.

The sixth is from the edge-cloud back to XR user device, denoted F. This step transmits any interactivity permissions or content from the 3rd Party API, or any XR environment interactivity or sensory data occurring beyond the locally generated XR environment.

The seventh is from the XR user device to the user, denoted G. This step transmits interactivity and sensory data from the XR user device to the point of transmission with users.

2. XR Interactive Body Feature and Connectivity Overlay Generation and Function

A component of creating realistic sensory responses in XR interactions is generating and maintaining a sensory connectivity overlay in XR space that detects interaction with designated body features and assigns sensory inputs or outputs to that space. This overlay comprises a designated area in physical space divided into a spatial grid of voxels of a given x-by-y-by-z dimensionality, where the dimensions of this space are determined by the technological constraints of the XR device in use. This designated space may comprise the entire area of use in some instances but may comprise a reduced area for others that require only limited areas of sensory interaction in others.

Figure 6:
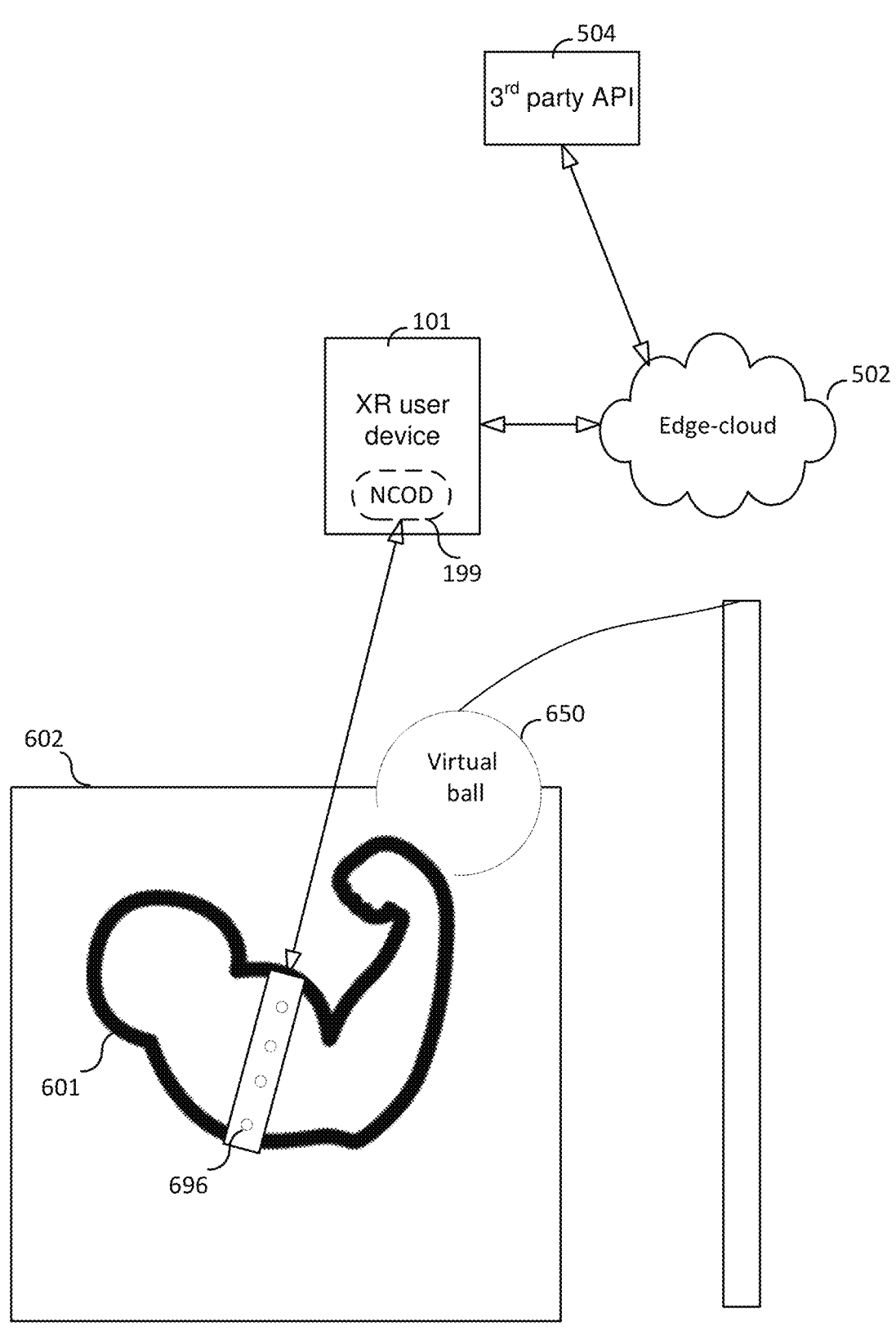
FIG. 6 illustrates a user interacting with a virtual ball.

Referring now to FIG. 6, NCOD 199 initializes by mapping a physical or virtually reconstructed body feature, a single limb 601 in this example, in a designated area 602 in conjunction with any relevant sensory information stored in the environment or the edge-cloud 502. For physical limbs mapped in their present locations, the XR user device maps their position in real time using its visual sensor array in conjunction with any relevant positional data from user-enabled wearable devices 696 indicating the presence and area of coverage within each voxel occupied by the static body feature in the overlay. The XR user device then updates this positional data in real time as the limb moves within the designated area. For virtually generated body features, the XR user device generates the feature according to a pre-defined sequence initiated by the user that specifies the dimensions and position of the limb in XR space.

In some embodiments, each body feature is assigned a unique sensory feature ID indicating the date and time of the feature generation, the user's identity, and the permissions granted by the user to transmit and receive each relevant type of sensory feedback. Users may manually provide authorization for each relevant type of sensory feedback within the XR interface itself or may automatically opt into experiencing certain types of sensory stimulation in an experience when accepting its terms and conditions.

TABLE 1

| Time and Date | User Id | Sensory Actuator Id | Sensory Permission |
|---|---|---|---|
| HH:MM:SS YYYY:MM:DD | ABC0123 | xyz789 | 0101 |

Table 1 shows an example sensory feature ID, which in this example includes four information elements (IEs). The first IE of the ID contains time and date information indicate the time and date that the feature was generated. The next IE (e.g., seven characters long) is the user id that specifies the user owner of the body feature. The next IE is the sensory actuator id that identifies a sensory actuator that the user may wear. The last IE (e.g., four bits) is the sensory permission field that specifies the specific sensory permissions corresponding to what kind of sensory data can be transmitted from and received by this sensory feature in accordance with the preferences of both the user and user.

Once the body feature is mapped and tagged within the overlay, NCOD 199 assigns a unique sensory environment ID to each voxel corresponding to two features. The first are the sensory permissions for that voxel that designate whether the user has authorized a sensory experience to take place in this area of the XR environment. The second are indicators of the possible sensory outcome indicators within each voxel. These indicators vary in number and complexity based on the number and potential intensities of possible sensory experiences in each voxel. These indicators can take the form of vectors of digit combinations specifying sensory reactions on one sensory dimension (tactile, smell, taste, for example), or arrays specifying sensory reactions for more than one sensory dimension.

TABLE 2

Actuator ID=Y Sensory Permission=0101
Object ID = Obj1
Sensory Stimulation:
  1 (haptic)
  2 (thermal)

TABLE 2-continued 3 (force)
  4 (texture)

Table 2 is an example that shows that the user has given permission for sensory actuator "Y" to provide haptic and force feedback to the user when the user virtually touches Obj1. That is the sensory permission value is a bitmap of four bits where each one of the bits corresponds to one of the four sensory stimulations. If we assume sensory stimulation 1 was activated (e.g., system produced haptic feedback) the sensory environment ID for this example would be Y;Obj1; 1. This corresponds to the sensory actuator sending and/or receiving the sensory stimulus and the part of the XR environment with which they are interacting. Doing this produces an ID for a unique sensory interaction. Accordingly, each sensory actuator of XR user device 101 is associated with sensory permission information (e.g., a bitmap) for a given object (or all objects or all objects of a given type) that specifies the allowed sensory stimulations with respect to the object.

2.1 Interaction ID

In one embodiment, NCOD 199 provides a mechanism for managing sensory interactions in the XR environment and transforming these interactions into sensory experiences that allow users to engage with both XR environments and the real world in a way that they could not otherwise. In order to capture the complex array of inputs and outputs required to create and manage a sensory experience in XR, NCOD 199 utilizes an interaction ID that allows users to regulate the interactive and sensory experiences generated within the XR environment. The interaction ID draws on information about the sensory actuators transmitting and receiving sensory data, the XR environment, and any relevant third party source to create a unique identifier for each point of interaction between a body feature that communicates several key components of information to the XR user device, mediating transmission and reception of interactive sensory information. In one embodiment, the interaction ID has the structure shown in the table below:

TABLE 3

| Object ID | Limb State | Outcome of interaction | Sensory Outcome | Third party API address | ID of paired Devices | Checksum |
|---|---|---|---|---|---|---|
| AAA12345 | 0001 | 0110 | 00 | xyz.com | AB12 | 0000 |

Table 3 illustrates a hypothetical interaction ID, which in this embodiment includes seven IEs. The first IE is the Object ID assigned to the XR object with which the user is interacting (e.g., the virtual ball shown 650 in FIG. 6). The next IE describe the limb state, e.g. interaction mode, grab mode, etc., and are defined by the app or hardware, such as interaction mode, grab mode, etc. The next IE is set by the app or hardware and describe the outcome of the interaction, e.g. move, purchase, etc. The next IE is set by the app or hardware and describe the sensory outcome, such as haptics, temperature, etc. The next IE comprises the address (e.g., Internet Protocol (IP) address or domain name) for any third-party API(s) and the information to be communicated to the API. The next IE include the unique identifiers or other IDs for paired devices, such as during collaborative experiences. The final IE is a checksum.

Accordingly, each IE represents a unique parameter (a.k.a., field) of the interaction ID, which will be initialized by the XR user device in the process designated below in Section 5.1.1 and programmed via user specifications in the interface transmitted to the device or carried over from previously programmed and saved directives. The XR user interface will allow for adjustment of these options. In one embodiment, the IEs of the interaction ID have the following symantics:

ObjectID: the unique ID of the XR object corresponding to the physical sensor sending neuromuscular movement data from the user to the XR device and receiving sensory feedback data to translate into haptic or other sensory responses.

State of Limb: an indicator designating the state of the generated limb. Users may wish to activate or deactivate the limb for certain activities within the XR environment.

Outcome of Interaction: an indicator designating the desired interactivity of the limb. Users may wish to enable or disable interaction with the limb within the XR experience. They may moderate the interactivity of the limb in question through this parameter.

Sensory Outcome: an indicator designating the desired sensory feedback they receive through interaction from the limb. This outcome is determined by pairwise matching or algorithmic transformation of the last four digits of the sensory feature ID indicating the feature-specific permissions and the corresponding six digits of sensory environment IDs. Users may wish to enable or disable sensory feedback through the limb within the XR experience.

3rd Party API routing: an indicator designating information to be communicated to a 3rd Party API and the address of the API. This may include a request, which would entail receiving information, or may include a simple transmission of information from within the experience to a $3^{rd}$ party application or service.

ID of Paired Devices: an indicator designating permissions for paired devices permitted to access the XR environment of the user. Users may wish to allow paired devices to view, interact with, and/or initiate sensory feedback with the limb.

Checksum: A protocol aggregating the unique inputs from the prior IDs and relaying the information within the process.

3. Interactive Consequences and Haptic Responses

Haptic responses, defined as tactile feedback (e.g., pressure, vibration, force, temperature, electrical, or other similar touch features), comprise a major feature of interactive sensory experiences. Haptics responses are used widely in human-computer interaction, with haptic responses already integrated as a major feature in mobile phone usage, video game sensory experiences, and electronic equipment usage. Haptics are currently, and may remain, the primary sensory feedback outcome from simple interactions in an XR environment. Because of the variety of ways that haptics are used to engage users, and the increased reach, scope, and capability that haptic sensory responses are likely to gain with the further integration of sensation into XR experiences, it is paramount to consumer safety, comfort, and accessibility that NCOD 199 be capable of moderating which user interactions are capable of producing interactive responses, particularly when those interactions may involve other users. While section 2 above defined the sensory permissions granted to limbs and the environment by the users themselves, this section specifies how users exert control over the interactive responses they potentially generate when interacting with objects and other people.

3.1 Haptics without Response

A User who do not wish to interact with object in an XR environment using a particular limb (e.g., a particular arm, hand, finger, etc.) may disable interactive responses for that limb. Within the interaction ID framework, the user would simply set the outcome of interactions within the XR environment to zero for that limb. This would give the user haptic to ability to interact with virtual (and physical, in the case of a virtually generated and managed XR body feature controlled by the user) features within the XR environment, but disable any interactive consequences of those interactions. In this example, the Outcome of Interaction IE is set at 0 because there is no response needed from the system.

3.2. Haptics with Local Response Only

A user who wishes to only interact with local features in their XR environment using the limb in question may disable third party API communication to allow only local responses. Within the interaction ID framework, the user would simply set the third-party API option within the XR environment to zero. This would give the user haptic sensory responses to interacting with physical and virtual features within the XR environment while allowing interaction with locally generated XR features that do not require permissions or communication with a third-party API.

3.3. Haptics with Third Party Response

A user who wish to interact with the third-party features in their XR environment using the limb in question may enable third party API communication to allow third party communication and interactive responses. Within the interaction ID framework, the user would simply allow the third-party API option within the XR environment. This would give the user haptic sensory responses to interact with physical and virtual features within the XR environment while allowing interaction with locally generated XR features that require permissions or communication with a third-party API.

3.4. Haptics with Device-to-Device Interaction

A user may wish to allow its XR user device to share information with another user's XR user device, such as information about their possible responses to stimuli, haptic information, or about their current status. Accordingly, in the scenario, the ID of Paired Device(s) IE contains a unique identifiers for each XR user device with which the user wants to share information.

3.5. Haptics with Device-to-Device Interaction and Third-Party Interaction

As noted above, a user may wish to allow its XR user device to share information with other devices, and, in some embodiments, this information may need to be augmented with data from third-parties, such as inventory availability when making a purchase via XR. In this scenario, the Third Party API IE would contain information about the 3rd-party (e.g., IP address) and the ID of Paired Device(s) IE contains the unique identifiers for the device(s) with which content is shared.

4. Sensory Input, Output, and Interaction.

As advances in connectivity and XR reality bridge the internet of things (IoT) into the internet of senses (IoS), NCOD 199 advances the current state of art in XR experiences by introducing a mechanism that moderates and manages sensory inputs and outputs in XR environments. NCOD 199 manages sensory feedback in two ways: by managing the permissions for various types of sensory feedback within the network of all parties interacting in XR space, and by moderating and adjusting the type of sensory feedback relayed through the XR environment based on 1)

the equipment available to users and 2) their preferences over certain types of sensation responses.

In one embodiment, NCOD 199 manages the permissions for the relaying of sensory information and feedback using the interaction ID. In this way, NCOD 199 not only respects user privacy and bodily autonomy, but also provides a foundation for the extension of sensory interactions in XR beyond the household and into public and commercial spaces with user owned and controlled devices by standardizing and simplifying the process of exchanging information, appropriate permissions for interaction, and consent to send and receive sensory stimulation. By protecting users while safely extending their horizons of possible experiences in XR environments, NCOD 199 provides advances in safety and adaptability.

NCOD 199 also moderates the specific type of sensory information sent and received from the user in an XR environment. The type of sensory feedback that can be sent and received by users varies considerably based on two factors: the sensory equipment available to them and/or others with whom they are interacting, and the user's preferences over what type of sensation responses they would like to enable or allow themselves to cause.

4.1 Sensory Feedback Inputs and Outputs by Types of Equipment.

4.1.1 Over-the-Skin Vibration Actuator

One type of sensory actuator is an over-the-skin vibration actuator. These devices transmit sensory data through over-the-skin tactile sensation without the use of electrode sensors. This may occur in the approximate area of the body where the sensation is designated to occur in XR space or in an alternative location, as determined by the design of the wearable or preferences of the user. Typically, these devices are limited in their ability to communicate sensory information about the user to the XR rendering device, but they may be equipped with visual or radio sensors that allow for the tracking of the user's movement in the XR space. They may also be equipped with temperature sensors for sensing the user's temperature.

4.1.2 Over-the-Skin Vibration Actuator with Electrode Sensory Array (EMG or Neural Impulse Detection Enabled).

Inputs. These devices transmit sensory data through a combination of over-the-skin tactile sensation and electrical stimulation of the peripheral nervous system through an array of electrodes placed over the skin. These electrodes can induce nervous system responses that simulate vibrations, pinching sensations, force resistance, and a limited sense of temperature change.

Outputs. These devices can detect electrical impulses in the peripheral nervous system that can be used to direct intentional movement at a fine level, particularly when paired with devices equipped with predictive machine learning technologies that translate EMG data to predicted movements and intended muscular force. The ability to detect electrical impulses from peripheral muscle systems and predict likely movement and muscular force patterns also means that users with limb-related disabilities equipped with EMG enabled electrode arrays will still be able to engage in interactive sensory experiences with the aid of an XR generated limb. In addition, electrode arrays equipped with temperature gauges will be able to detect temperature, enabling the communication of temperature related sensory information from the user to the XR environment.

4.1.3 Minimally Invasive Sub-Dermal Electrode Sensory Array (EMG or Neural Impulse Detection Enabled)

Input. These devices transmit sensory data through sub-dermal and intra-muscular electrical stimulation of the peripheral nervous system using an array of electrodes. These electrodes can induce nervous system responses that simulate vibrations, pinching sensations, force resistance, and a limited sense of temperature change.

Output. These devices can detect electrical impulses in the peripheral nervous system without the interference of the dermal layer that can be used to direct intentional movement at a very fine level, particularly when paired with devices equipped with predictive machine learning technologies that translate EMG data to predicted movements and intended muscular force. The ability to detect electrical impulses from peripheral muscle systems and predict likely movement and muscular force patterns also means that users with limb-related disabilities equipped with EMG enabled electrode arrays will still be able to engage in interactive sensory experiences with the aid of an XR generated limb. In addition, electrode arrays equipped with temperature gauges will be able to detect temperature, enabling the communication of temperature-related sensory information from the user to the XR environment.

4.1.4. Osseo-Integrated Electrode Sensory Array for Bi-Directional Sensory Relay (in Conjunction with Prosthetic Implant)

Input. These devices transmit sensory data through sub-dermal and intra-muscular electrical stimulation of the peripheral nervous system using an array of electrodes that are anchored to bone tissue within the limb. These electrodes can induce nervous system responses that simulate vibrations, pinching sensations, force resistance, and a limited sense of temperature change. Anchoring these sensors within the bone allows for more efficient bidirectional transmission of neuro-electrical signals with minimal distortion from surrounding tissue and reduced interference from the outside environment.

Output. These devices can detect electrical impulses in the peripheral nervous system without the interference of the dermal layer or outside environment that can be used to direct intentional movement at an extremely fine level-particularly when paired with devices equipped with predictive machine learning technologies that translate EMG data to predicted movements and intended muscular force. The ability to detect electrical impulses from peripheral muscle systems and predict likely movement and muscular force patterns also means that users with limb-related disabilities equipped with EMG-enabled electrode arrays will still be able to engage in interactive sensory experiences with the aid of an XR-generated limb. In addition, electrode arrays equipped with temperature gauges at the dermal level will be able to detect temperature, enabling the communication of temperature-related sensory information from the user to the XR environment.

4.1.5 Neuro-Link Headset (Brain-Connected and Controlled Neurological Connection)

Input. These devices would transmit sensory data through the direct communication of neuro-electrical impulses to the corresponding region of the brain responsible for interpreting those sensory inputs using an array of electrodes that are connected to an overlaying or implanted feature or wearable connected to the user. These electrodes could induce nervous system responses that simulate vibrations, pinching sensations, force resistance, taste, smell, and a complete sense temperature change.

Output. These devices can detect electrical impulses in the peripheral nervous system without the interference of the dermal layer or outside environment that can be used to direct intentional movement at an extremely fine level, particularly when paired with devices equipped with predictive machine learning technologies that translate brain-wave data to predicted movements and intended muscular force, limb state activity, and sensory communication. The ability to detect electrical impulses directly from the brain and predict likely movement and muscular force patterns also means that users with limb related disabilities equipped with EMG enabled electrode arrays would be able to engage in potentially fully interactive sensory experiences with the aid of an XR generated limb. In addition, electrode arrays equipped with temperature gauges at the dermal level will be able to detect temperature, enabling the communication of temperature-related sensory information from the user to the XR environment.

5.0 Setup of Controls

In one embodiment, NCOD 199 provides a means that enables the user to specify the types of sensations—sound, visual features, haptics, sensory feedback, or even smells or tastes—the user would like to have control over. In one embodiment, this means is a simple user interface 702 (see FIG. 7) that is employed through which the user is granted access to a series of sensory domains and given options for which experiences within those domains they may moderate using their available XR user device and any supplemental devices they may have connected. This user interface 702 allows the user to set the parameters for sensory adjustments locally on the XR user device before pushing any requests for adjustment to be made 1) with other users through the edge-cloud or 2) with any third-party entities via an outside API.

Figure 7:
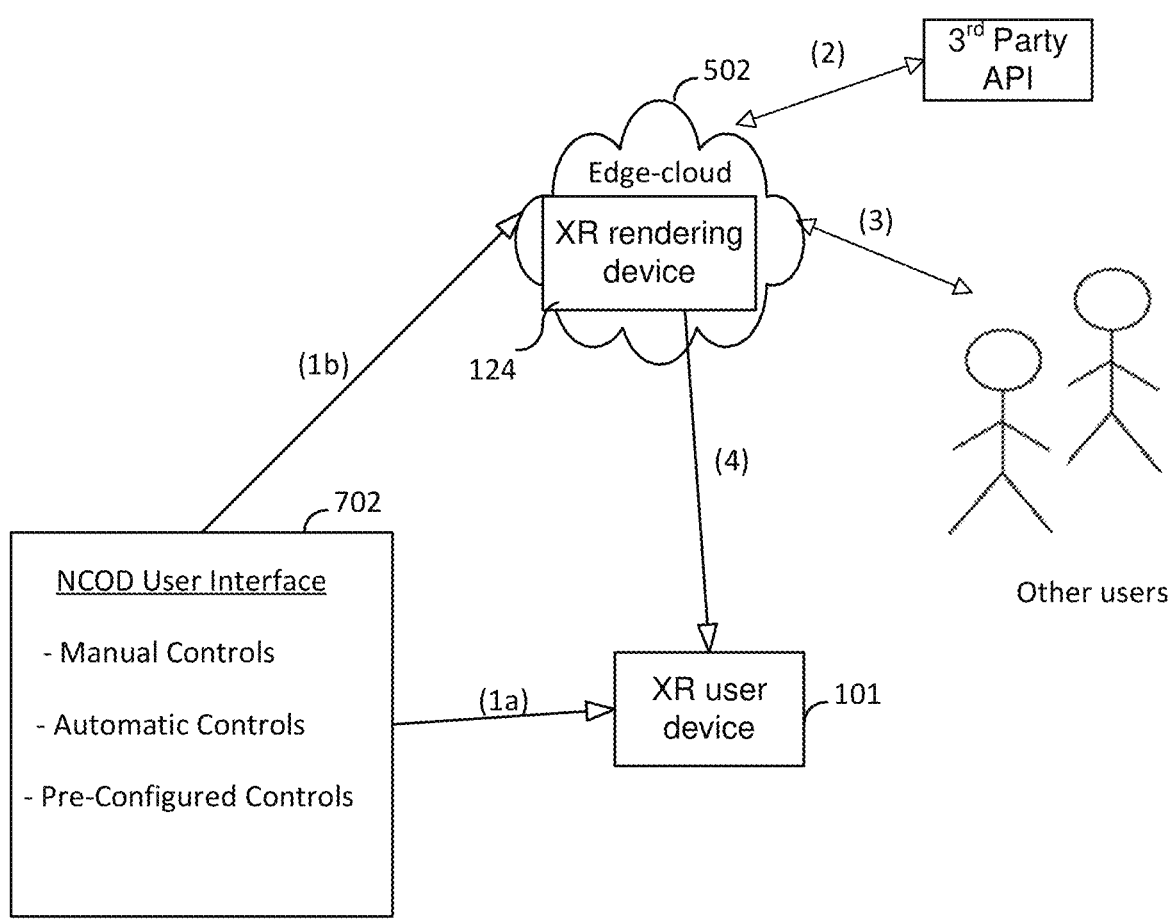
FIG. 7 illustrates an example of a user interface.

The flow of information, according to one embodiment, is illustrated in FIG. 7. The example illustrated flow includes five potential relays of information. The flow begins with NCOD 199 presenting user interface 702 to the user where the user sets the type of controls that they would like to use to moderate the sensory environment. NCOD 199 then either directly institutes these controls into the moderation of content generated by XR user device 101 directly (1a) or communicates with an edge-cloud 502 to communicate the necessary permissions to alter the generation of the XR content, access an edge-cloud-based/hosted library of experiences to help identify violating sensory stimuli, or moderate sensory content indirectly (1b).

In one embodiment, the library of experiences is an online database recording the expected sensory measurements of particular experiences based on prior measurements, recordings, or user entries (and so on). Thus, a third party may construct and maintain a database of sound information with the following series of variables: sensory emitter (what individual or object in the XR environment produced the sensory stimulus); level (value assigned to the intensity or presence of the stimulus); unit (relevant unit assigned to the level, e.g. decibels or frame rate of strobing light); source of entry (how did this data enter the database); coordinates (spatial location); type of Location (public business, private business, public outdoor space, private outdoor space, theme park, etc); time data collected or recorded (timestamp of when data was captured). This information could then be used to train a model (anything from a really basic classifier to neural networks) predicting potentially violated stimulus in XR environments before or as they are rendered for the end user based on end user's specifications of violating sensations and automatically moderate them in accordance with the end user's moderation preferences.

NCOD 199 may also need to communicate with third-party APIs in order to directly moderate an experience offered through a third-party service or disclose that they are deactivating or modulating part of the sensory environment (2). Likewise, NCOD 199 may need to communicate with other users through the edge-cloud or through another form of shared connection to share or obtain permissions to alter the generation of a shared environment or notify them that they are making changes to a shared XR experience (3). Finally, data transmitted to the edge-cloud during this process may be communicated back to XR user device 101 to assist in moderating of sensory experiences in the XR environment (4).

As illustrated herein, NCOD 199 effectively exists as a layer in between the data, media, and services requested by the user and what is ultimately output (e.g., displayed) to the user. NCOD 199 has some degree of control over the sensory stimulations that are provided to the user (e.g., displayed in screen space or output through other actuators, such as for example, audio, haptics, or other sensory responses). Users define the required degree of control, either by default settings (e.g. no deafening sounds), through an application or service (e.g. an application to eliminate strobing lights), or preference settings (e.g. no audio above 80 dB). Referring to the amount of manual intervention required of users to adjust sensory output, this control layer can be manual, semi-automatic, or fully automatic. This section introduces multiple verities of sensory sensitivity control layers, which vary as a function of how much manual intervention is required. Additionally, NCOD 199 also allows sensory sensitivity controls to be shaped or affected by third party services or APIs. Users may set their policy preferences when turning the headset on for the first time, when launching a new application or service, or when creating a user account.

5.1. Manual Controls

In one embodiment, the sensory sensitivity controls are fully manual. In other words, users must manually request that sensory outputs be moderated. A potential example of a manual intervention includes turning on silent mode where all environmental noise is removed. While automated sensory controls may automatically adjust environmental noise based on user settings, the key distinction with manual controls is that the system does not react unless and until the user requests it to do so. When in manual mode, NCOD 199 may operate in the edge-cloud 502 or on the XR headset 120 (or other component of XR user device 101). In the first case, environmental data sensed by sensor of XR user device 101 are streamed (e.g., via a wireless access network) to the edge-cloud where it is then processed (e.g., processed using a machine learning model or other Artificial Intelligence (AI) unit). Once the processing is complete, the moderated data is then returned to the XR headset. In the second case, environmental data is processed via algorithms that run locally on the XR headset and then displayed.

In order to select features, users would initiate NCOD 199 through an interaction with their XR user device 101 within the XR environment. They would then select the category of sensory experience in their environment that they would like to manually control from a list of the possible sensory experiences that can be moderated within NCOD 199. NCOD 199 would then generate a list of the potential sensory experiences that could be moderated within the XR environment for the user to manually select and lead the user to either deactivate or otherwise modulate the intensity of that feature. Potential selection triggers include gestures, eye movements, or switches on the headset.

5.2 Automated Controls

In another embodiment, the sensory sensitivity controls are fully automated. In other words, unlike the manual controls, automated controls do not activate in direct response to a user input, but rather activate based on pre-specified and stored user preference information. A potential example of an automatic intervention includes preventing the user from sensing a particular feedback based on a pre-specified preference, rather than a real-time preference. Unlike manual controls, these automated adjustments occur without users having to take an action other than, at most, pre-specifying their preferences (e.g. using the user interface 702 shown in FIG. 7). These automated adjustments may be defined by policies set by the user, an application, or service.

When in automatic mode, NCOD 199 may operate in the edge-cloud or on the XR headset 120 (or other component of XR user device 101). In the first case, environmental data sensed by sensor of XR user device 101 are streamed (e.g., via a wireless access network) to the edge-cloud where it is then processed (e.g., processed using a machine learning model or other Artificial Intelligence (AI) unit). Once the processing is complete, the moderated data is then returned to the XR headset. In the second case, environmental data is processed via algorithms that run locally on the XR headset and then displayed.

5.3. Semi-Automated Controls.

In another embodiment, the controls are semi-automated. Unlike manual controls and automated controls, semi-automated controls only turn on upon user request (e.g. launching an application or service). Unlike manual controls, which require user intervention, semi-automated controls then thereafter operate in a fully automated fashion.

6.0 Setup of Interfacing with Local/Public/Commercial Environments

Owners of physical spaces that are likely to trigger sensory issues may wish to inform potential visitors of this, and pre-emptively trigger modifications of a sensory experience for a visitor. For instance, a venue that uses strobe lights might want to pre-emptively alert users that such lights are likely to be used, and allow users to moderate them. Accordingly, in some embodiments, third parties can provide information about the sensory environments that they either control or have information about. Such interfacing will be helpful in providing additional input to NCOD 199.

FIG. 8 is a flow chart illustrating a process 800, according to an embodiment, for generating, for a first user, XR content for an XR environment with which the first user is interacting. Process 800 may be performed by an XR rending device (e.g., XR rendering device 124) having a neuro-muscular connectivity overlay device (e.g. NCOD 199) and may begin in step s802.

Step s802 comprises obtaining (e.g., retrieving or receiving) first user preference information for the first user, the first user preference information comprising sensory permission information indicating, expressly or implicitly, one or more sensory stimulations to which the first user agrees to be exposed. For example, in step s802 the first user preference information is retrieved from a user preference database 172. Database 172 can be any type of database (e.g., relational, NoSQL, centralized, distributed, flat file, etc.). In one embodiment, preferences that do not change dynamically (potentially stored as JSON or XML files) could be fetched via HTTP GET. Preferences and responses that change dynamically could be streamed via protocols such as Reliable Datagram Sockets (RDS) or Reliable UDP (RUDP) that are not request-response oriented. The table below illustrates an example piece of preference information.

```
<message from='device@example.org'
   to='client@example.org/amr'>
   <fields xmlns='urn:xmpp:iot:sensordata' seqnr='1' done='true'>
      <node nodeId='Device01'>
         <timestamp value='2019-03-07T16:24:30'>
            <numeric name='maximumDB' value='100' unit='decibels'/>
         </timestamp>
      </node>
   </fields>
</message>
```

Step s804 comprises obtaining XR scene configuration information for use in generating XR content for the first user. For example, in step s804 the XR rendering device may obtain the XR scene configuration information by retrieving the information from database 171. Database 171 can be any type of database (e.g., relational, NoSQL, centralized, distributed, flat file, etc.).

Step s806 comprises generating XR content for the first user based on the sensory permission information and the XR scene configuration information such that the generated XR content does not comprise XR content for producing any sensory stimulation to which the first user has not agreed to be exposed. Step s808 comprises providing the generated XR content to an XR user device worn by the first user, wherein the XR user device comprises one or more sensory actuators (e.g., actuators 134, 135, 227, 696) for producing one or more sensory stimulations. For example, in step s808 the XR rendering device provides the generated content to the XR user device by transmitting the XR content to the XR user device via a network. Any protocol or combination of protocols may be used to transmit the XR content (e.g., DASH, HLS, HTTP).

In some embodiments, the XR scene configuration information indicates that the XR content should include data corresponding to a particular sensory stimulation to which the first user has not agreed to be exposed, and the step of generating the XR content for the first user based on the sensory permission information and the XR scene configuration information comprises refraining from including in the generated XR content the data corresponding to the particular sensory stimulation.

In some embodiments, the step of generating the XR content for the first user based on the sensory permission information and the XR scene configuration information further comprises including in the generated XR content data corresponding to a modified version of the particular sensory stimulation.

In some embodiments the process further includes obtaining (e.g., receiving) XR action information pertaining to a second user with which the first user is interacting within the XR environment, wherein the generation of the XR content is further based on the XR action information pertaining to the second user. In some embodiments, the XR action information pertaining to the second user indicates that the second user has performed an action intended to cause the XR rendering device to produce XR content for producing a particular sensory stimulation for the first user, and the step of generating the XR content for the first user based on the sensory permission information, the XR scene configuration information, and the XR action information pertaining to the second user comprises refraining from including in the generated XR content the XR content for producing the particular sensory stimulation. In some embodiments, the step of generating the XR content for the first user based on the sensory permission information, the XR scene configuration information, and the XR action information pertaining to the second user further comprises including in the generated XR content data corresponding to a modified version of the particular sensory stimulation.

In some embodiments the process also includes obtaining environmental data indicating a sensory stimulation in the first user's physical environment, wherein the generation of the XR content is further based on the environmental data. For example, the environmental data may be received from a sensor.

In some embodiments, obtaining first user preference information comprises obtaining pre-specified first user preference information (as opposed to user preference information specified in real-time) (e.g., the pre-specified first user preference information may be retrieved from user preference database 172).

FIG. 9 is a flow chart illustrating a process 900, according to an embodiment, for moderating a first user's sensory experience with respect to an XR environment with which the first user is interacting. Process 900 may be performed by NCOD 199 and may begin in step s902.

Step s902 comprises obtaining first user preference information for the first user, the first user preference information comprising sensory permission information indicating one or more sensory stimulations to which the first user expressly or implicitly agrees to be exposed. For example, in step s902 the first user preference information may be obtained by retrieving it from user preference database 172.

Step s904 comprises obtaining XR content produced by an XR rending device. For example, in step s904 the XR content is received from the XR rendering device. Step s906 comprises modifying the XR content based on the sensory permission information to produce modified XR content that does not comprise XR content for producing any sensory stimulation to which the first user has not agreed to be exposed, wherein the modified XR content is translated by an XR user device into at least one sensory stimulation.

In some embodiments, the XR content includes data corresponding to a particular sensory stimulation, the sensory permission information indicates that the first user has not agreed to be exposed to the particular sensory stimulation, and the step of modifying the XR content based on the sensory permission information comprises modifying the XR content such that the data is not included in the modified XR content.

In some embodiments, the data corresponding to the particular sensory stimulation was generated by the XR rendering device based on one or more actions performed by a second user with which the first user is interacting in the XR environment.

In some embodiments, the step of modifying the XR content based on the sensory permission information further comprises including in the modified XR content data corresponding to a modified version of the particular sensory stimulation.

In some embodiments the process also includes obtaining environmental data indicating a sensory stimulation in the first user's physical environment, wherein the modification of the XR content is further based on the environmental data. For example, the environmental data may be received from a sensor.

In some embodiments, obtaining first user preference information comprises obtaining pre-specified first user preference information (e.g., the pre-specified first user preference information may be retrieved from user preference database 172).

Figure 10:
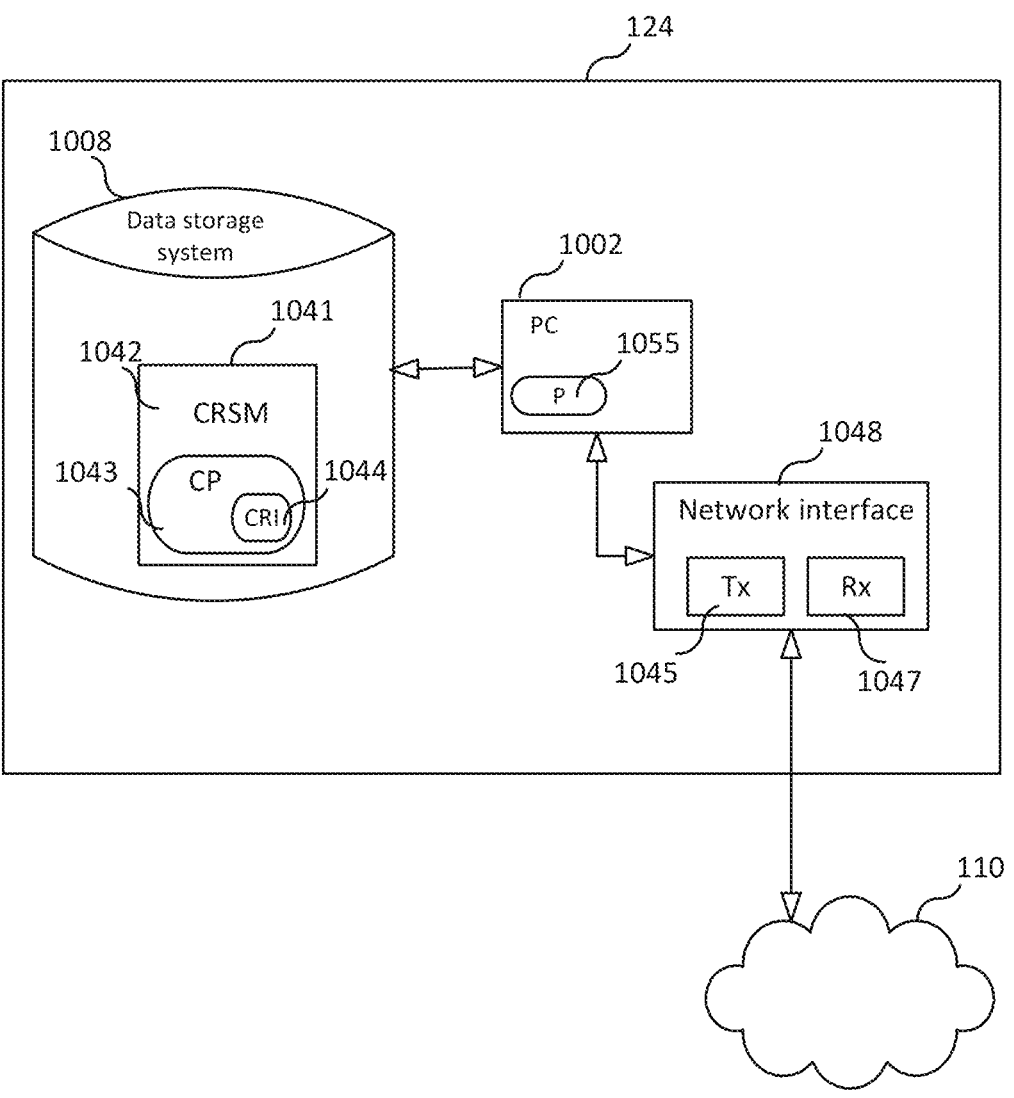
FIG. 10 illustrates an XR rendering device according to an embodiment.

FIG. 10 is a block diagram of XR rendering device 124, according to some embodiments. As shown in FIG. 10, XR rendering device 124 may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., XR rendering device 124 may be a distributed computing apparatus); at least one network interface 1048 (e.g., a physical interface or air interface) comprising a transmitter (Tx) 1045 and a receiver (Rx) 1047 for enabling XR rendering device 124 to transmit data to and receive data from other nodes connected to a network 110 (e.g., an Internet Protocol (IP) network) to which network interface 1048 is connected (physically or wirelessly) (e.g., network interface 1048 may be coupled to an antenna arrangement comprising one or more antennas for enabling XR rendering device 124 to wirelessly transmit/receive data); and a local storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes XR rendering device 124 to perform steps described herein (e.g., steps described herein with reference to the flow charts). In other embodiments, XR rendering device 124 may be configured to perform steps described herein without the need for code. That is, for example, PC 1002 may consist merely of one or more ASICs. Hence, the features of the embodiments described herein may be implemented in hardware and/or software.

Figure 11:
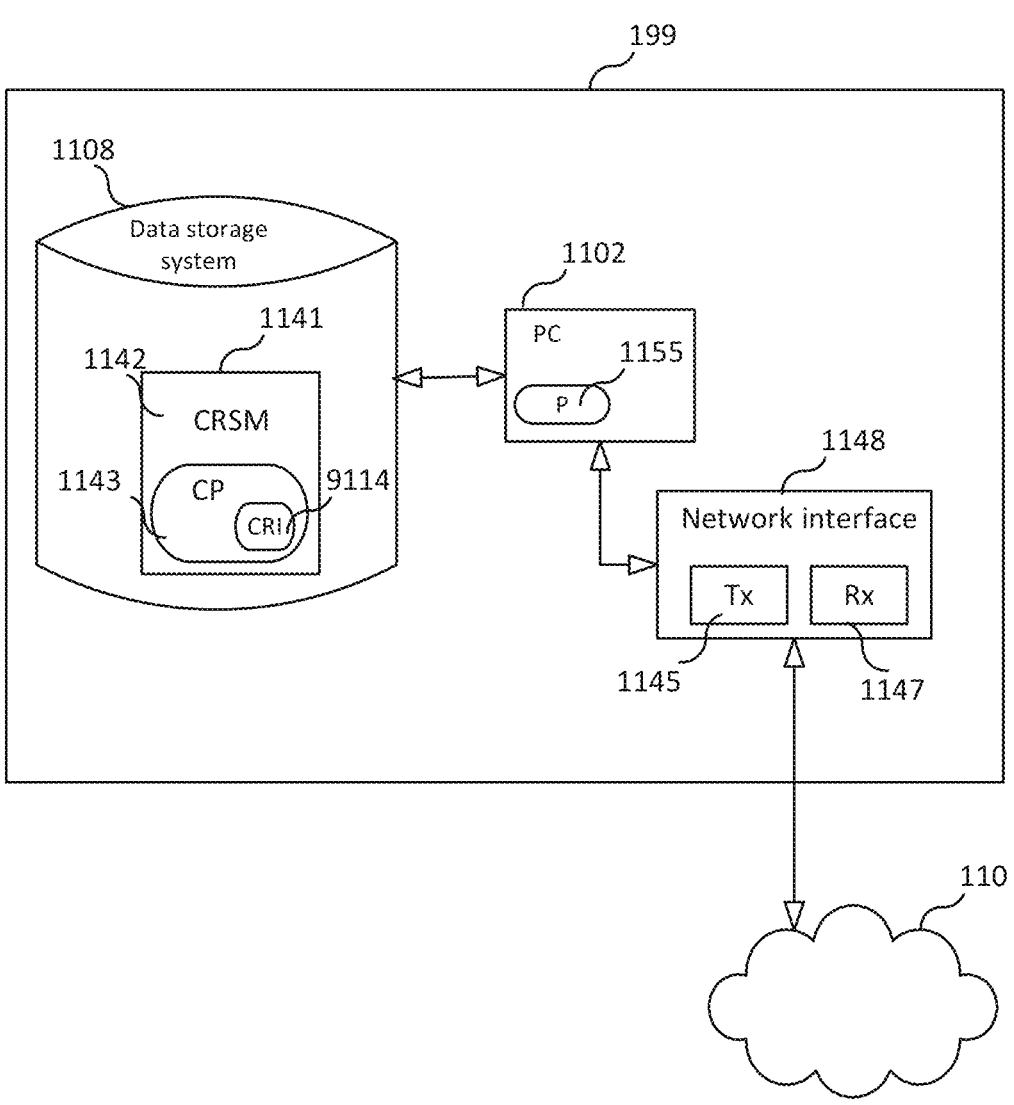
FIG. 11 illustrates an NCOD according to an embodiment.

FIG. 11 is a block diagram of NCOD 199, according to some embodiments. As shown in FIG. 11, NCOD 199 may comprise: processing circuitry (PC) 1102, which may include one or more processors (P) 1155 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., NCOD 199 may be a distributed computing apparatus); at least one network interface 1148 (e.g., a physical interface or air interface) comprising a transmitter (Tx) 1145 and a receiver (Rx) 1147 for enabling NCOD 199 to transmit data to and receive data from other nodes connected to a network 110 (e.g., an Internet Protocol (IP) network) to which network interface 1148 is connected (physically or wirelessly) (e.g., network interface 1148 may be coupled to an antenna arrangement comprising one or more antennas for enabling NCOD 199 to wirelessly transmit/receive data); and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI)

1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes NCOD 199 to perform steps described herein (e.g., steps described herein with reference to the flow charts). In other embodiments, NCOD 199 may be configured to perform steps described herein without the need for code. That is, for example, PC 1102 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by an extended reality (XR) rending device having a neuro-muscular connectivity overlay device (NCOD) for generating, for a first user, XR content for an XR environment with which the first user is interacting, the method comprising:

obtaining first user preference information for the first user, the first user preference information comprising sensory permission information indicating, expressly or implicitly, i) one or more tactile feedback stimulations to which the first user agrees to be exposed, ii) one or more olfactory stimulations to which the first user agrees to be exposed, and/or iii) one or more taste stimulations to which the first user agrees to be exposed;

obtaining XR scene configuration information for use in generating XR content for the first user;

generating XR content for the first user based on the sensory permission information and the XR scene configuration information such that the generated XR content does not comprise XR content for producing any sensory stimulation to which the first user has not agreed to be exposed; and providing the generated XR content to an XR user device worn by the first user, wherein the XR user device comprises one or more sensory actuators for producing one or more sensory stimulations, wherein the sensory permission information comprises:

i) an object identifier identifying a particular object or a particular type of object; and ii) permission information indicating at least a first type of tactile feedback to which the first user agrees to be exposed with respect to the particular object or particular object type.

2. The method of claim 1, wherein the XR scene configuration information indicates that the XR content should or must include data corresponding to a particular sensory stimulation to which the first user has not agreed to be exposed, and generating the XR content for the first user based on the sensory permission information and the XR scene configuration information comprises refraining from including in the generated XR content the data corresponding to the particular sensory stimulation.

3. The method of claim 2, wherein generating the XR content for the first user based on the sensory permission information and the XR scene configuration information further comprises including in the generated XR content data corresponding to a modified version of the particular sensory stimulation.

4. The method of claim 1, wherein the method further comprises:

obtaining XR action information pertaining to a second user with which the first user is interacting within the XR environment, wherein the generation of the XR content is further based on the XR action information pertaining to the second user.

5. The method of claim 4, wherein the XR action information pertaining to the second user indicates that the second user has performed an action intended to cause the XR rendering device to produce XR content for producing a particular sensory stimulation for the first user, and generating the XR content for the first user based on the sensory permission information, the XR scene configuration information, and the XR action information pertaining to the second user comprises refraining from including in the generated XR content the XR content for producing the particular sensory stimulation.

6. The method of claim 5, wherein generating the XR content for the first user based on the sensory permission information, the XR scene configuration information, and the XR action information pertaining to the second user further comprises including in the generated XR content data corresponding to a modified version of the particular sensory stimulation.

7. The method of claim 1, wherein the method further comprises obtaining environmental data indicating a sensory stimulation in the first user's physical environment, and the generation of the XR content is further based on the environmental data.

8. The method of claim 1, wherein obtaining first user preference information comprises obtaining pre-specified first user preference information.

9. A non-transitory computer readable medium storing a computer program comprising instructions which when executed by processing circuitry of an extended reality (XR) rendering device causes the XR rendering device to perform the method of claim 1.

10. The method of claim 1, wherein the sensory permission information comprises:

i) an actuator identifier identifying a particular feedback actuator; and ii) permission information indicating at least a first type of feedback to which the first user agrees to be exposed.

11. A method performed by neuro-muscular connectivity overlay device (NCOD) for moderating a first user's sensory experience with respect to an extended reality (XR) environment with which the first user is interacting, the method comprising:

obtaining first user preference information for the first user, the first user preference information comprising sensory permission information indicating i) one or more tactile feedback stimulations to which the first user expressly or implicitly agrees to be exposed, ii) one or more olfactory stimulations to which the first user agrees to be exposed, and/or iii) one or more taste stimulations to which the first user agrees to be exposed;

obtaining XR content produced by an XR rending device; and modifying the XR content based on the sensory permission information to produce modified XR content that does not comprise XR content for producing any sensory stimulation to which the first user has not agreed to be exposed, wherein the modified XR content is translated by an XR user device into at least one sensory stimulation, wherein the sensory permission information comprises:

i) an object identifier identifying a particular object or a particular type of object; and ii) permission information indicating at least a first type of tactile feedback to which the first user agrees to be exposed with respect to the particular object or particular object type.

12. The method of claim 11, wherein the XR content includes data corresponding to a particular sensory stimulation, the sensory permission information indicates that the first user has not agreed to be exposed to the particular sensory stimulation, and modifying the XR content based on the sensory permission information comprises modifying the XR content such that the data is not included in the modified XR content.

13. The method of claim 12, wherein the data corresponding to the particular sensory stimulation was generated by the XR rendering device based on one or more actions performed by a second user with which the first user is interacting in the XR environment.

14. The method of claim 12, wherein modifying the XR content based on the sensory permission information further comprises including in the modified XR content data corresponding to a modified version of the particular sensory stimulation.

15. The method of claim 11, wherein the method further comprises obtaining environmental data indicating a sensory stimulation in the first user's physical environment, and the modification of the XR content is further based on the environmental data.

16. A non-transitory computer readable medium storing a computer program comprising instructions which when executed by processing circuitry of an neuro-muscular connectivity overlay device (NCOD) causes the NCOD to perform the method of claim 11.

17. An extended reality (XR) rendering device for generating, for a first user, XR content for an XR environment with which the first user is interacting, the XR rendering device comprising a neuro-muscular connectivity overlay device (NCOD) comprising:

processing circuitry; and a memory, the memory containing instructions executable by the processing circuitry, whereby the XR rendering device is configured to:

obtain first user preference information for the first user, the first user preference information comprising sensory permission information indicating, expressly or implicitly, i) one or more tactile feedback stimulations to which the first user agrees to be exposed, ii) one or more olfactory stimulations to which the first user agrees to be exposed, and/or iii) one or more taste stimulations to which the first user agrees to be exposed;

obtain XR scene configuration information for use in generating XR content for the first user;

generate XR content for the first user based on the sensory permission information and the XR scene configuration information such that the generated XR content does not comprise XR content for producing any sensory stimulation to which the first user has not agreed to be exposed; and provide the generated XR content to an XR user device worn by the first user, wherein the XR user device comprises one or more sensory actuators for producing one or more sensory stimulations, wherein the sensory permission information comprises:

i) an object identifier identifying a particular object or a particular type of object; and ii) permission information indicating at least a first type of tactile feedback to which the first user agrees to be exposed with respect to the particular object or particular object type.

18. A neuro-muscular connectivity overlay device (NCOD) comprising:

processing circuitry; and a memory, the memory containing instructions executable by the processing circuitry, whereby the NCOD is configured to:

obtain first user preference information for a first user, the first user preference information comprising sensory permission information indicating i) one or more tactile feedback stimulations to which the first user expressly or implicitly agrees to be exposed, ii) one or more olfactory stimulations to which the first user agrees to be exposed, and/or iii) one or more taste stimulations to which the first user agrees to be exposed;

obtain extended reality (XR) content produced by an XR rending device; and modify the XR content based on the sensory permission information to produce modified XR content that does not comprise XR content for producing any sensory stimulation to which the first user has not agreed to be exposed, wherein the modified XR content is translated by an XR user device into at least one sensory stimulation, wherein the sensory permission information comprises:

i) an object identifier identifying a particular object or a particular type of object; and ii) permission information indicating at least a first type of tactile feedback to which the first user agrees to be exposed with respect to the particular object or particular object type.

19. The NCOD of claim 18, wherein the XR content includes data corresponding to a particular sensory stimulation, the sensory permission information indicates that the first user has not agreed to be exposed to the particular sensory stimulation, and modifying the XR content based on the sensory permission information comprises modifying the XR content such that the data is not included in the modified XR content.

* * * * *